(12) United States Patent
Reiserer et al.

(10) Patent No.: US 12,172,161 B2
(45) Date of Patent: Dec. 24, 2024

(54) MICROFLUIDIC SYSTEMS FOR MULTIPLE BIOREACTORS AND APPLICATIONS OF SAME

(71) Applicant: VANDERBILT UNIVERSITY, Nashville, TN (US)

(72) Inventors: Ronald S. Reiserer, Nashville, TN (US); John P. Wikswo, Brentwood, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 18/015,782

(22) PCT Filed: Jul. 19, 2021

(86) PCT No.: PCT/US2021/042179
§ 371 (c)(1),
(2) Date: Jan. 12, 2023

(87) PCT Pub. No.: WO2022/016143
PCT Pub. Date: Jan. 20, 2022

(65) Prior Publication Data
US 2023/0338949 A1    Oct. 26, 2023

Related U.S. Application Data

(63) Continuation-in-part of application No. PCT/US2020/040061, filed on Jun. 29, 2020, and a
(Continued)

(51) Int. Cl.
*B01L 3/00* (2006.01)
*F04B 43/06* (2006.01)
(Continued)

(52) U.S. Cl.
CPC ... *B01L 3/502715* (2013.01); *B01L 3/502738* (2013.01); *B01L 2300/123* (2013.01);
(Continued)

(58) Field of Classification Search
CPC .......................... B01L 3/0289; B01L 3/50273
See application file for complete search history.

(56) References Cited

U.S. PATENT DOCUMENTS 6,079,313 A    6/2000  Wolcott et al.
7,745,211 B2   6/2010  Takayama et al.
(Continued)

FOREIGN PATENT DOCUMENTS

CN    101948746 B    7/2013
JP    2009515146 A   4/2009

OTHER PUBLICATIONS

Korean Intellectual Property Office (ISR/KR), "International Search Report for PCT/US2021/042179", Korea, Nov. 1, 2021.
(Continued)

*Primary Examiner* — Natalia Levkovich
(74) *Attorney, Agent, or Firm* — Locke Lord LLP; Tim Tingkang Xia, Esq.

(57) ABSTRACT

A fluidic system includes a fluid distribution network, and a fluid collection and sampling network; a plurality of fluidic modules fluidically coupled between the fluid distribution network and the fluid collection and sampling network in parallel; a systemic circulation and mixing reservoir; and a first pump, and a second pump, wherein the first pump is fluidically coupled between the systemic circulation and mixing reservoir and the fluid distribution network for withdrawing media from the systemic circulation and mixing reservoir and delivering the media to the fluid distribution network; and wherein the second pump is fluidically coupled between the fluid collection and sampling network
(Continued)

and a sample vial for withdrawing effluent of the plurality of fluidic modules from the fluid collection and sampling network and delivering the effluent to one or more sample vials.

21 Claims, 25 Drawing Sheets

Related U.S. Application Data continuation-in-part of application No. 17/269,349, filed as application No. PCT/US2019/047307 on Aug. 20, 2019, now Pat. No. 11,465,144, application No. 18/015,782 is a continuation-in-part of application No. 17/269,329, filed as application No. PCT/US2019/047190 on Aug. 20, 2019, now abandoned.

(60) Provisional application No. 63/163,160, filed on Mar. 19, 2021, provisional application No. 63/139,138, filed on Jan. 19, 2021, provisional application No. 63/053,388, filed on Jul. 17, 2020, provisional application No. 62/868,303, filed on Jun. 18, 2019, provisional application No. 62/719,868, filed on Aug. 20, 2018.

(51) Int. Cl.
*F04B 43/14* (2006.01)
*F16K 99/00* (2006.01)

(52) U.S. Cl.
CPC ....... B01L 2400/0481 (2013.01); F04B 43/06 (2013.01); F04B 43/14 (2013.01); F16K 99/0057 (2013.01); F16K 2099/0084 (2013.01)

(56) References Cited

U.S. PATENT DOCUMENTS

| | | | |
|---|---|---|---|
| 9,618,129 B2 | 4/2017 | Block, III et al. | |
| 9,874,285 B2 | 1/2018 | Block, III et al. | |
| 10,023,832 B2 | 7/2018 | Wikswo et al. | |
| 10,078,075 B2 | 9/2018 | Wikswo et al. | |
| 10,444,223 B2 | 10/2019 | Wikswo et al. | |
| 10,464,064 B1 | 11/2019 | Wikswo et al. | |
| 10,487,819 B2 | 11/2019 | Gould et al. | |
| 10,532,354 B2 | 1/2020 | Wikswo et al. | |
| 10,538,726 B2 | 1/2020 | Wikswo et al. | |
| 10,577,574 B2 | 3/2020 | Wikswo et al. | |
| 2002/0048536 A1* | 4/2002 | Bergh .................. | B01L 3/5025 422/640 |
| 2012/0309635 A1 | 12/2012 | Trinkle et al. | |

OTHER PUBLICATIONS

Esch, M B, et al., How multi-organ microdevices can help foster drug development. Adv. Drug Del. Rev., 69:158-169. 2014.
Abaci, H E, and Shuler, M L. Human-on-a-chip design strategies and principles for physiologically based pharmacokinetics/pharmacodynamics modeling. Integr. Biol., 7:383-391. 2015.
Wang, Y I, et al., Self-contained, low-cost Body-on-a-Chip systems for drug development. Exp. Biol. Med.:Accepted. 2017.
Maschmeyer, I, et al., A four-organ-chip for interconnected long-term co-culture of human intestine, liver, skin and kidney equivalents. Lab Chip, 15:2688-2699. 2015.
Edington, C D, et al., Interconnected Microphysiological Systems for Quantitative Biology and Pharmacology Studies. Sci. Rep., 8: 4530. 2018.
Novick, A, and Szilard, L. Experiments with the Chemostat on Spontaneous Mutations of Bacteria. Proc. Natl. Acad. Sci., 36:708-719. 1950.
King, R D, et al., The Robot Scientist Adam. Comp, 42:46-54. 2009.
King, R D, Rowland, J, Oliver, S G, Young, M, Aubrey, W, Byrne, E, Liakata, M, Markham, M, Pir, P, Soldatova, L N, Sparkes, A, Whelan, KE, and Clare, A. The automation of science. Science, 324:85-89. 2009.
Sparkes, A, et al., Cheaper faster drug development validated by the repositioning of drugs against neglected tropical diseases. J. R. Soc. Interface, 12: 20141289. 2015.
Coutant, A, et al., Closed-loop cycles of experiment design, execution, and learning accelerate systems biology model development in yeast. Proc. Natl. Acad. Sci. U.S.A., 116:18142-18147. 2019.
Ratcliffe, E, et al., A novel automated bioreactor for scalable process optimisation of haematopoietic stem cell culture. J. Biotechnol., 161:387-390. 2012.
Davis, D, et al., Modeling perfusion at small scale using ambr15TM, In: Integrated Continuous Biomanufacturing II, ECI Symposium Series. C. Goudar, S. Farid, C. Hwang and K. Lacki, eds. 2015. https://dc.engconfintl.org/biomanufact_ii/128.
Zoro, B, and Tait, A, Development of a novel automated perfusion mini bioreactor "ambr® 250 perfusion", In: Integrated Continuous Biomanufacturing III, ECI Symposium Series. S. Farid, C. Goudar, P. Alves and V. Warikoo, eds. 2017. https://dc.engconfintl.org/biomanufact_ii/128.
Bareither, R, et al., Automated Disposable Small Scale Reactor for High Throughput Bioprocess Development: A Proof of Concept Study. Biotechnol. Bioeng., 110:3126-3138. 2013.
Zhong, Z W, et al., Automated Continuous Evolution of Proteins in Vivo. ACS Synth. Biol., 9:1270-1276. 2020.
Heins, Z J, et al., Designing Automated, High-throughput, Continuous Cell Growth Experiments Using eVOLVER. J. Vis. Exp.: e59652. 2019.
Wong, B G, et al., Precise, automated control of conditions for high-throughput growth of yeast and bacteria with eVOLVER. Nat. Biotechnol., 36:614-623. 2018.
Lee, K S, et al., Microfluidic chemostat and turbidostat with flow rate, oxygen, and temperature control for dynamic continuous culture. Lab Chip, 11:1730-1739. 2011.
Bower, D M, et al., Fed-batch microbioreactor platform for scale down and analysis of a plasmid DNA production process. Biotechnol. Bioeng., 109:1976-1986. 2012.
King, R D, et al., Make Way for Robot Scientists. Science, 325:945-945. 2009.
Bilsland, E, et al., Yeast-based automated high-throughput screens to identify anti-parasitic lead compounds. Open Biology, 3: 120158. 2013.
King, R D. Automating Chemistry and Biology Using Robot Scientists. In: Ki 2015: Advances in Artificial Intelligence, Lecture Notes in Artificial Intelligence, vol. 9324. S. Holldobler, M. Krotzsch, R. Penaloza and S. Rudolph, eds. pp XIV-XV. 2015.
King, R D, and Roberts, S, Artificial intelligence and machine learning in science, In: OECD Science, Technology and Innovation Outlook 2018: Adapting to technological and societal disruption, Cha 5. OECD Publishing, Paris. pp 121-136. 2018. https://doi.org/10.1787/sti_in_outlook-2018-10-en.
Wikswo, J, et al., Scaling and systems biology for integrating multiple organs-on-a-chip. Lab Chip, 13:3496-3511. 2013.
Darby, S, et al., A metering rotary nanopump for microfluidic systems. Lab Chip, 10:3218-3226. 2010. PMCID: PMC4156019.
Wikswo, J P, et al., Engineering Challenges for Instrumenting and Controlling Integrated Organ-on-Chip Systems. IEEE Trans. Biomed. Eng., 60:682-690. 2013. PMCID: PMC3696887.
Markov, D A, et al., Tape underlayment rotary-node (TURN) valves for simple on-chip microfluidic flow control. Biomed. Microdevices, 12:135-144. 2010.
LeDuc, P R, Messner, W C, and Wikswo, J P. How do control-based approaches enter into biology? Annu. Rev. Biomed. Eng., 13:369-396. 2011.
Cyr, K J, Avaldi, O M, and Wikswo, J P. Circadian hormone control in a human-on-a-chip: In vitro biology's ignored component? Exp. Biol. Med., 242:1714-1731. 2017. PMCID: PMC5832251.
Miller, D R, et al., A bistable, multiport valve enables microformulators creating microclinical analyzers that reveal aberrant glutamate metabolism in astrocytes derived from a tuberous sclerosis patient. Sens. Actuators B Chem., 341: 129972. 2020.

(56) References Cited

OTHER PUBLICATIONS

NCATS Supports Award-Winning Technology for Drug Development: NIH; 2018 [updated Sep. 21, 2018. https://ncats.nih.gov/pubs/features/microformulator (accessed Jan. 2, 2019).

* cited by examiner

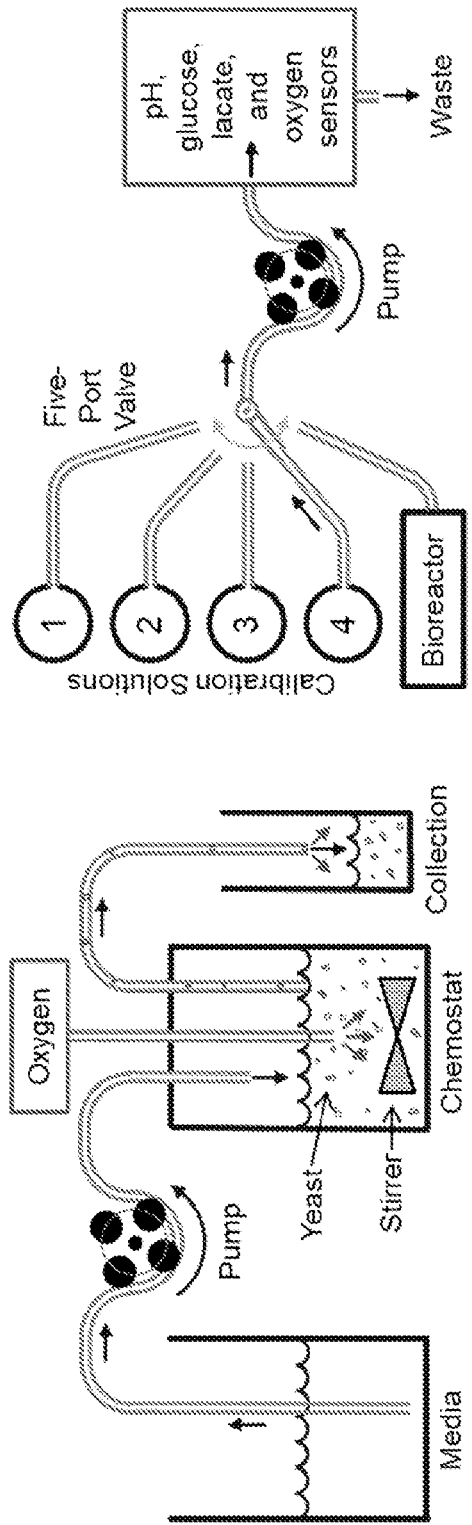
FIG. 2A
FIG. 2B
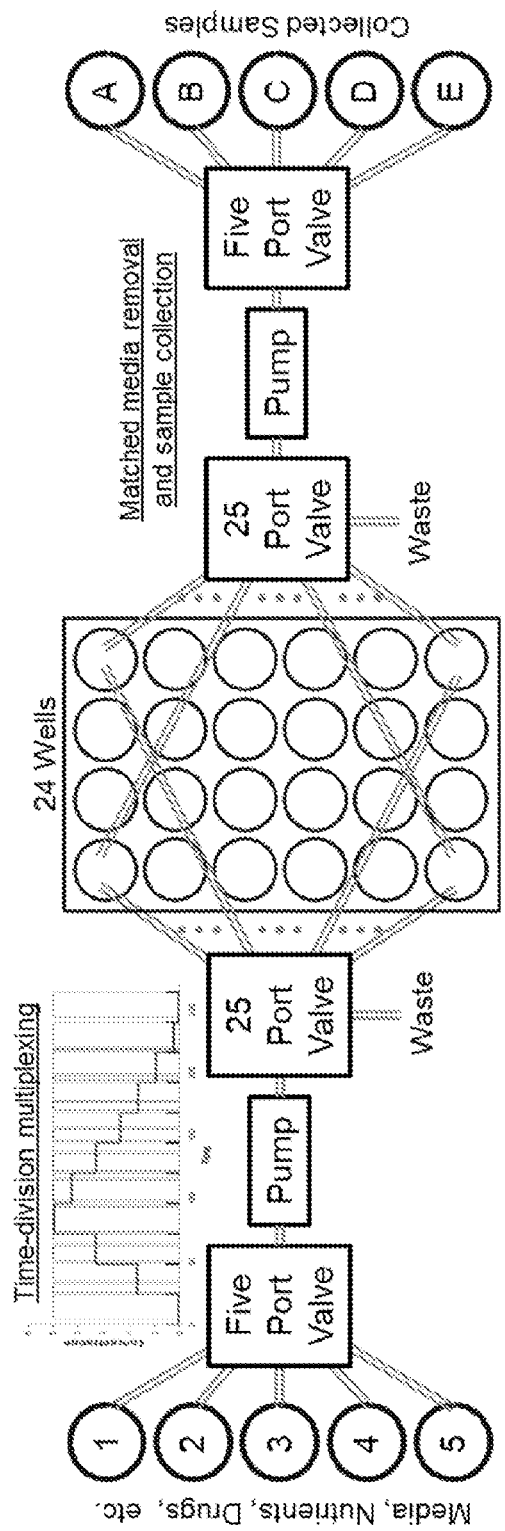
FIG. 2C

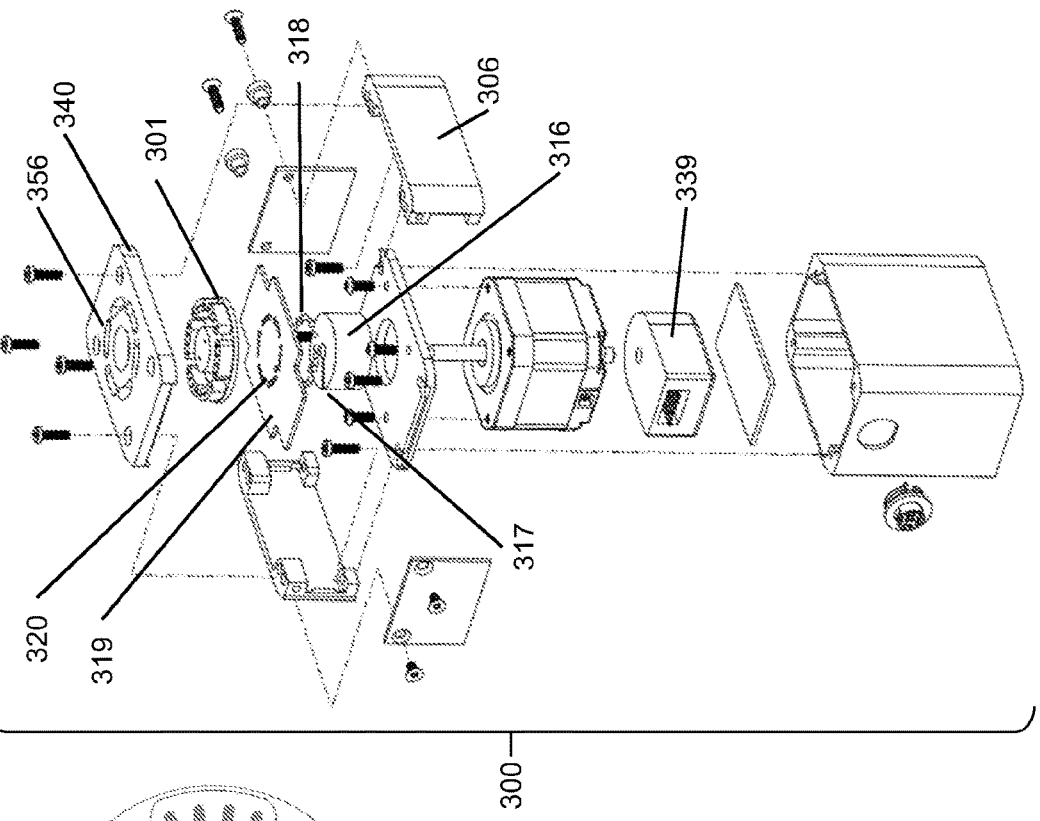
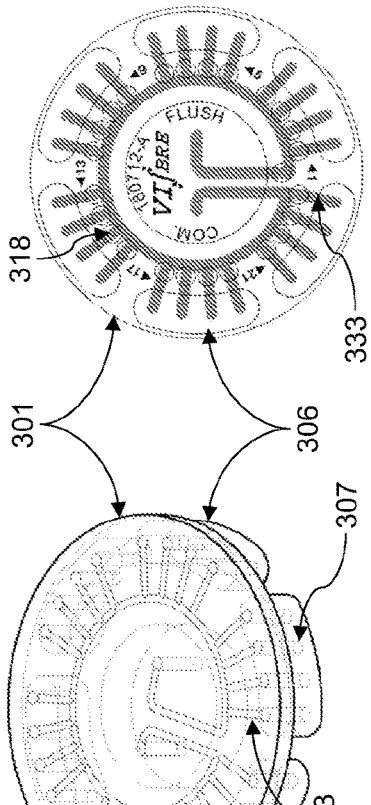
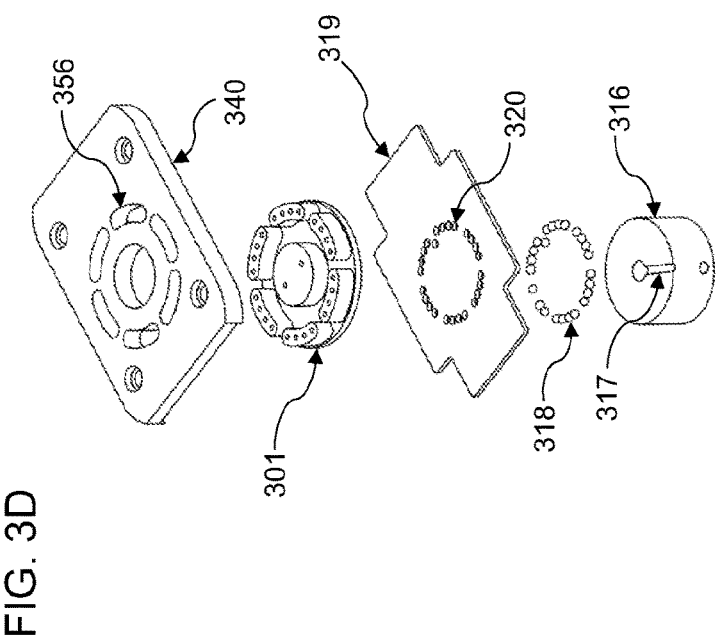

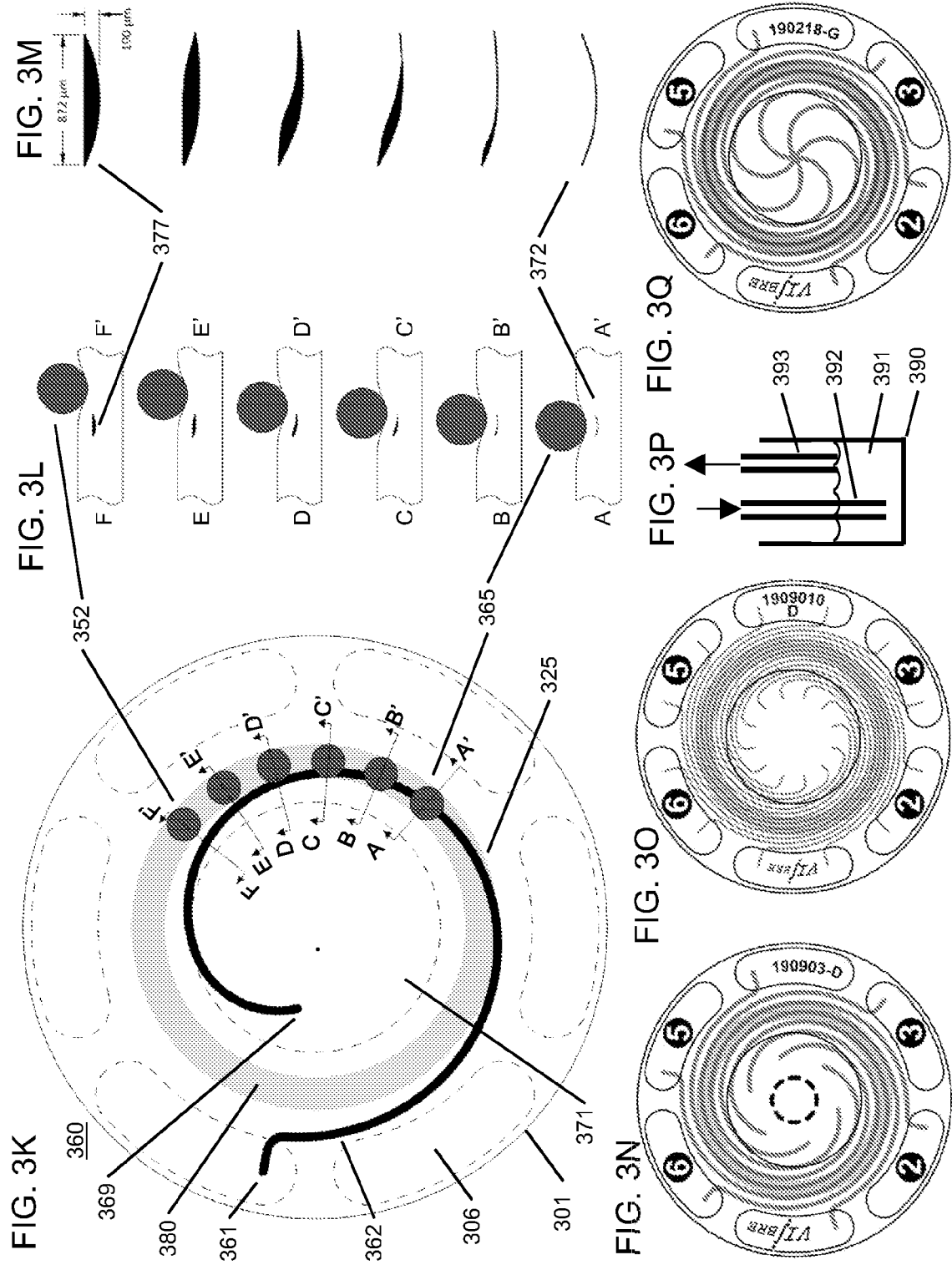

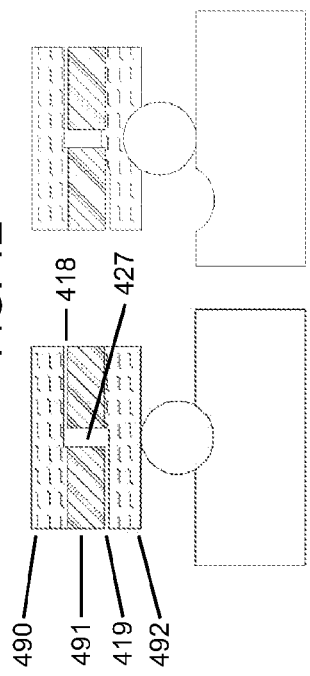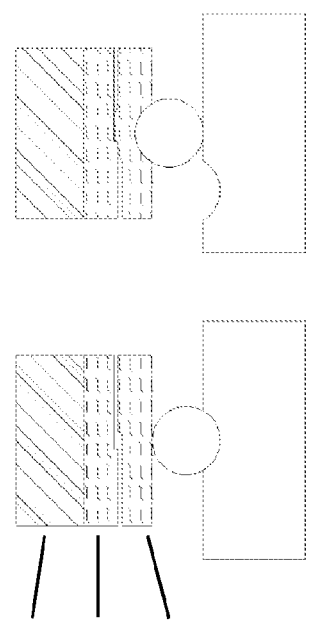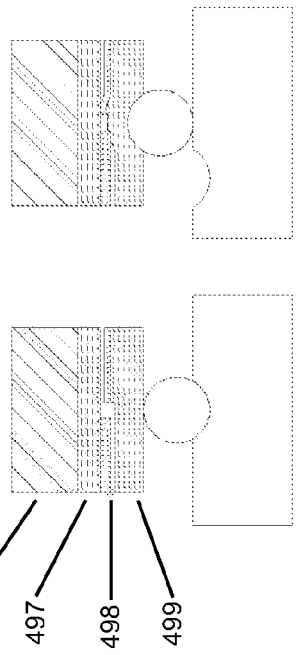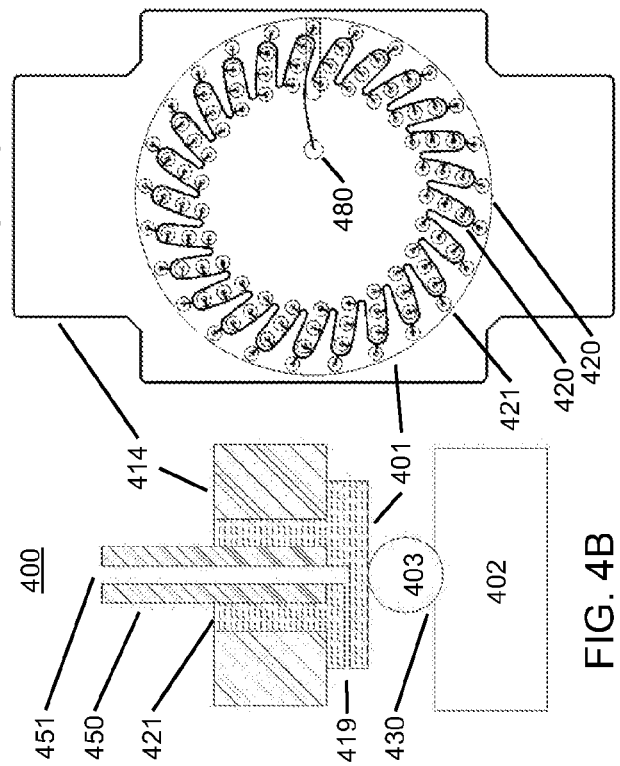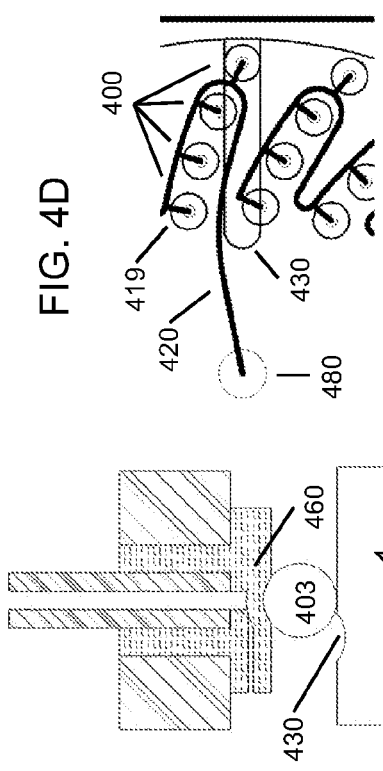

Run Mode

Analysis Mode

MICROFLUIDIC SYSTEMS FOR MULTIPLE BIOREACTORS AND APPLICATIONS OF SAME

CROSS-REFERENCE TO RELATED PATENT APPLICATIONS

This application claims priority to and the benefit of U.S. Provisional Patent Application Ser. No. 63/053,388, filed Jul. 17, 2020; 63/139,138, filed Jan. 19, 2021; and 63/163,160, filed Mar. 19, 2021.

This application is also a continuation-in-part application of PCT Patent Application Serial No. PCT/US2020/040061, filed Jun. 29, 2020, which itself claims priority to and the benefit of U.S. Provisional Patent Application Ser. No. 62/868,303, filed Jun. 28, 2019.

This application is also a continuation-in-part application of U.S. patent application Ser. No. 17/269,349, filed Feb. 18, 2021, which is a national stage entry of PCT Patent Application Serial No. PCT/US2019/047307, filed Aug. 20, 2019, which itself claims priority to and the benefit of U.S. Provisional Patent Application Ser. Nos. 62/719,868, filed Aug. 20, 2018, and 62/868,303, filed on Jun. 28, 2019.

This application is also a continuation-in-part application of U.S. patent application Ser. No. 17/269,329, filed Feb. 18, 2021, which is a national stage entry of PCT Patent Application Serial No. PCT/US2019/047190, filed Aug. 20, 2019, which itself claims priority to and the benefit of U.S. Provisional Patent Application Ser. Nos. 62/719,868, filed Aug. 20, 2018, and 62/868,303, filed on Jun. 28, 2019.

This application is related to a PCT Patent Application Serial No. PCT/US2021/042141, filed Jul. 19, 2021, which is filed on the same day that this application is filed, and with the same applicant as that of this application.

Each of the above-identified applications is incorporated herein by reference in its entirety.

STATEMENT AS TO RIGHTS UNDER FEDERALLY-SPONSORED RESEARCH

This invention was made with government support under Contract No. HHSN2712017000044C, and Grant Nos. TR002383, TR002243, TR002097, and CA202229, awarded by the National Institutes of Health, Grant No. CBET1706155, awarded by the National Science Foundation, and Grant No. 80NSSC20K0108, awarded by the National Aeronautics and Space Administration. The government has certain rights in the invention.

FIELD OF THE INVENTION

The invention relates generally to fluidic systems, and more particularly to microfluidic systems for multiple bioreactors and applications of the same.

BACKGROUND OF THE INVENTION

The background description provided herein is for the purpose of generally presenting the context of the invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the invention.

Today, in vitro cell culture for pharmacology, toxicology, and basic research that uses well plates or larger cell culture Petri dishes or flasks typically involves experimental protocols that replace the culture media every day or two. Highly effective, automated robotic hardware and software have been developed such that a single high-throughput screening (HTS) system can seed, dose, and measure in a single day tens of thousands of wells in plates that contain as many as 1534 wells. FIG. 1A presents a computer simulation of a metabolic inhibition experiment using batch culture of adherent cells, with media replacement every 24 hours that can maximize the concentration changes at the end of each 24-hour period, but subjects the cells to continuously changing nutrient and metabolite concentrations. In the three 24-hour batch cycles in FIG. 1A, the concentration of the nutrient, [S], decreases after each feeding, and the concentration of metabolites, [Metab], increases. For the second interval, the concentration of a growth inhibitor, [Inhib], is non-zero, and the resulting rates of consumption of nutrient S and production of metabolite Metab are both decreased as compared to the first interval. The absence of Inhib in the third batch cycle produces higher rates of consumption of S and production of Metab. The technical challenge in understanding the mechanism of action of the inhibitor during the second interval as compared to the first and third arises from the continuous changes in [S] and [Inhib] throughout the three intervals, which can affect both the reaction kinetics and even the cellular gene expression.

An alternative approach to in vitro biology that is growing in popularity is the use of three-dimensional (3D) cell culture with organs-on-chips or organoids that requires close-to-continuous perfusion, provided by either height differences in reservoir fluid levels, syringe pumps, on-chip or off-chip peristaltic pumps, or pressurized reservoirs. Many chips have been single-pass perfused by the pressure from liquid in a pipette tip or a syringe body connected to the chip directly or by a tube. Experiments involving recirculation of single-organ or coupled-organ chips typically use rocking gravity perfusion or on-chip pumps. 96-well plates have been developed to support multiple organoids and simple organ chips, and typically use media changes every day or two and/or rocking to keep the organoids and organ chips appropriately perfused. Without recirculation, the concentration of the nutrients and metabolites in the media can reach a steady state, but the cultured cells may not be exposed to the levels of cellular metabolites normally experienced in vitro. With recirculation, the concentrations of nutrients and metabolites will change over time as the media is conditioned. The media will have to be replaced or removed/refreshed regularly if the 3D culture is to be maintained for a long period of time.

As a third approach to in vitro biology, typically with vastly larger volumes and much smaller numbers of parallel operations, bioreactors whose volumes range from 1 milliliter to 5,000 liters are often operated in a batch mode, for which the bioreactors are loaded with microbial or mammalian cells, nutrients, growth factors, and other compounds. With continuous stirring and oxygenation, the cells are then allowed grow, divide, and increase in number until the nutrients are depleted and/or metabolic products accumulate to a level where either the products are harvested or the media is renewed. FIG. 1B illustrates the growth of suspended cells in a batch bioreactor, with three sequential cycles of cell seeding, growth-to-quiescence, and harvesting. In each cycle, the optical density, OD, of the cell suspension within the bioreactor increases with time and the concentration of the rate-limiting nutrient [S] decreases from the initial value at loading until it is depleted, whereupon the cell growth stops, the cells become quiescent, and OD plateaus. In the second and third cycles, higher concentrations of the inhibitor [Inhib] decrease the rates of both cell growth and increase in OD, and increase the time from seeding to the plateau. Quantifying the effect of the growth inhibitor requires multiple measurements to determine the rate of change in OD with time and identify the time of plateau, which can be subject both to noise and the choice of a measurement threshold. Furthermore, the gene expression profiles of the cells will change throughout the growth curve, as nutrients are depleted and metabolite concentrations increase. In the somewhat more complicated fed-batch mode, nutrients are added either continuously or periodically to support continued cell growth. In some continuous bioreactors, cells lost in the media change are captured and returned.

Alternatively, chemostats use the continuous delivery of fresh media and the simultaneous removal of conditioned media and excess cells to maintain a biochemical steady state. FIG. 1C shows the operation of a hypothetical yeast chemostat, starting with initial seeding at 0 hours. Media is delivered continuously, with the concentration of the rate-limiting nutrient $[S_o]$ unchanged during the entire experiment. For the first approximately 8 hours, the number of yeast cells in the chemostat, and the optical density, OD, of the effluent increase steadily, and the concentration of the rate-limiting nutrient [S] decreases. The volume of the chemostat is fixed, so as media is delivered, media also is removed as effluent, but this means the yeast are removed as well. As the concentration of yeast within the chemostat increases, so does the concentration of yeast in the effluent. If yeast are removed faster than they replicate, as would be the case with a high rate of media replacement, i.e., a high dilution rate, the total number of yeast in the chemostat would decrease and eventually become zero. Instead, in typical chemostat operation, the concentrations of essential nutrients in the media and the dilution rate are adjusted so that the balance between yeast replication and removal are balanced at a chosen optical density, shown in FIG. 1C as the plateaus between 8 and 24 hours. During this time, OD, [S], and gene expression remain constant, hence the name "chemostat." At 24 hours, an inhibitor is added to the delivered media at a concentration [Inhib], and after a time interval determined by the dilution rate, the plateaued growth rate of yeast cells and the corresponding OD are lower than from hours 8 through 24, while [S] is higher because of the effects of Inhib. At 48 hours, [Inhib] is increased again, and the plateau value of OD is lower and [S] is higher. In each of these three plateaus, there is ample time to collect sufficient cells for untargeted multi-omics measurements, e.g., transcriptomics, proteomics, lipidomics, and metabolomics, and observation of other manifestations of the effects of the inhibitor.

Custom HTS systems have been used for batch yeast culture studies that are driven by artificial intelligence (AI) software to create robot-scientist/self-driving laboratories. The interpretation of batch yeast culture by robot-scientist/ self-driving laboratory systems is complicated by the aforementioned change in gene expression profiles during the time from seeding to depletion of the rate-limiting nutrients. One solution to this problem is to switch to chemostats, but there are no existing chemostat technologies that can be scaled to thousands of channels. Commercially available bioreactors are deployed extensively by the biopharmaceutical and biomanufacturing industries, which operate them in either serial-batch, batch-fed, or chemostat modes to produce fermented beverages, industrial biomolecules, and pharmaceuticals including recombinant proteins, antibody fragments, and monoclonal antibodies. The industry-leading Sartorius product line has bioreactor volumes ranging from 15 mL to 2000 L, each representing critical stages in scale-up to commercial biomolecule production, including 24 15 mL bioreactors and 250 mL bioreactors, respectively, at a cost of $350,000 and $1,084,000, respectively. These units are served by an HTS-grade fluid-handling system, and may share an analytical instrument, such as the NovaBiomedical BioProfile Flex2 Automated Cell Culture Analyzer, which can withdraw samples from up to ten bioreactors, count cells, perform metabolic measurements every 10 minutes, costs about $145,000, and requires expendable supplies that cost≥$500/week.

An extensive review of smaller volume bioreactors identified four systems worthy of note. The eVOLVER is an excellent example of an academic open-source system, developed at Boston University and available from Labmaker.org with 16 10 ml bioreactors, pumps, and control electronics for $12,950. This system produces useful results, but its unpackaged electronics are not appropriate for long-term use of a thousand or more channels in a core facility, and the system does not support multiport valves. The Cytena c. Bird is used to accelerate the clonal expansion of single mammalian cells and uses pneumatic actuation to increase oxygen transfer rate in a 96- and 24-well plate, with a three-unit system costing $16,500 and unable to operate as a chemostat. The Erbi Breez™ microbioreactor developed at MIT is too expensive to scale to 1,000 channels: a system with 4 2 ml bioreactors costs $180,000 and a year's supply of bioreactor cartridges costs about $140,000. The BioLector operates a single, shaken 48-well plate, uses a pipetting robot, costs $550,000, and cannot operate as a chemostat. The largest bioreactor systems typically operate as separate systems, for which ten or fewer systems might share an analytical instrument as discussed above.

Possibly the best way to accelerate the discovery and modeling of biological metabolic and signaling pathways will be to create thousand-channel, or larger, robot scientists/ self-driving laboratories. None of these large or small bioreactor systems are suitable or affordable to be expanded from 48 or fewer channels to a thousand or more. None have demonstrated a particularly high level of parallel fluidic automation, but simply replicate an isolated system multiple times or use multi-pipette fluid handlers.

None of these in vitro cell culture technologies support the exposure of the cultured cells to physiologically realistic circadian rhythms or time-dependent drug concentrations that mimic pharmacokinetic (PK) changes in drug concentration over time.

We recognize that while the perfusion approaches used for most 3D cell culture studies to date can be well suited for simple single-fluidic module studies, any experiments that demands the coupling of multiple organs with attention to fluidic module scaling will ultimately require pumps, valves, and control systems, and that currently available peristaltic and syringe pumps and microfluidic valves are ill-suited for coupling multiple organ chips. Over the past decade, the Vanderbilt Institute for Integrative Biosystems Research and Education (VIIBRE) has invented, patented, and demonstrated a new class of microfluidic pumps and valves that have been optimized for use with organ-on-chip or tissue-chip microbioreactors.

These microfluidic pump and valve technologies can be used create a single-channel microformulator, as well as 24- and 96-channel microformulators that can deliver over long exposure experiments a different time-dependent media composition to each well of a 24- or 96-well plate, including circadian or PK profiles. The same hardware can be used to create a microdialysis imager. FIG. 1D presents a simulation of a continuous-perfusion microformulator experiment with confluent, growth-inhibited cells in one well of a multi-well plate. During the first 24 hours, the delivered concentration of the rate-limiting nutrient [So], the number of cells in the well, the cells' total metabolic rate, and the concentrations of unused S and metabolite [Metab] in the effluent are all steady. At 24 hours, the microformulator uses time-division multiplexing of different stock solutions to create a typical PK profile for the concentration of the inhibitor, [Inhib]. The cells respond with an appropriate temporal response in the reduction of [Metab] and a reduced consumption of S, and hence an increase in [S] as compared to the first 24 hours. While the gene expression profiles can be changing during the PK profile, the changes observed in this in vitro experiment should track those that occur in vivo, and are critical to understanding the mechanism of action of a drug. It is clear upon comparing FIGS. 1A and 1B for batch processing with FIGS. 1C and 1D with continuous flow that the latter provides a much more stable, readily interpreted environment for the cells being cultured. This will be particularly important in any system that uses massively parallel organs-on-chips, organoids, or other cellular bioreactors or culture systems.

FIGS. 2A-2C provide a schematic representation of several of the key technologies associated with FIGS. 1A-1D. FIG. 2A shows a conventional continuous-flow chemostat, where media with a predetermined concentration of nutrients, drugs, toxins and other factors is pumped at a steady rate into a stirred, constant-volume chemostat. The effluent is collected, where its optical density and other metabolic and multi-omic variables are measured. FIG. 2B shows a microclinical analyzer that provides automated calibration of a multianalyte electrochemical sensor. FIG. 2C illustrates the concept of a multiwell microformulator, which involves the parallel application of the pumps, valves, and controllers in FIG. 2B, uses time-division multiplexing to deliver a different, realistic pharmacokinetic drug profile (inset) to each well of a 96-well plate, and can separately store samples from each well.

However, there is still an unaddressed need to operate large arrays of isolated or coupled organ chips, bioreactors, chemostats and other perfused bio-objects with a level of fluidic control and parallelism that goes beyond that of existing capabilities.

SUMMARY OF THE INVENTION

One aspect of the present invention relates to a fluidic system. The fluidic system includes a fluid distribution network and a fluid collection and sampling network; a plurality of fluidic modules fluidically coupled between the fluid distribution network and the fluid collection and sampling network in parallel; a systemic circulation and mixing reservoir; and a first pump, and a second pump, wherein the first pump is fluidically coupled between the systemic circulation and mixing reservoir and the fluid distribution network for withdrawing media from the systemic circulation and mixing reservoir and delivering the media to the fluid distribution network; and wherein the second pump is fluidically coupled between the fluid collection and sampling network and a sample vial for withdrawing effluent of the plurality of fluidic modules from the fluid collection and sampling network and delivering the effluent to one or more sample vials.

In one embodiment, each fluidic module comprises wells in a well plate, organ- or organoid-chips, bioreactors, or other bio-objects.

In one embodiment, the second pump is further fluidically coupled between the fluid collection and sampling network and a replacement media reservoir for providing make-up media from the replacement media reservoir and to the fluid collection and sampling network to replace what is removed therefrom for sampling.

In one embodiment, the fluid collection and sampling network is fluidically coupled to the systemic circulation and mixing reservoir so that a return flow bus delivers media back to the systemic circulation and mixing reservoir.

In one embodiment, the second pump is a two-channel sampling and make-up pump.

In one embodiment, the fluidic system further comprises a balance flow bus fluidically coupled between the first pump and the fluid collection and sampling network; and a network pump fluidically coupled between the first pump and the fluid distribution network.

In one embodiment, the fluidic system further comprises an upstream throttling valve fluidically coupled between the fluid distribution network and the plurality of fluidic modules for selectively controlling different flow through different fluidic modules.

In one embodiment, the fluidic system further comprises a downstream throttling valve fluidically coupled between the plurality of fluidic modules and the fluid collection and sampling network for completely isolating one or more fluidic modules from the others, and/or separately regulating flow and pressure in each fluidic module.

In one embodiment, each of the upstream throttling valve and the downstream throttling valve is a multichannel selector valve.

In one embodiment, both the upstream throttling valve and the downstream throttling valve form a single 2×N channel module selector valve having a single input port, first N ports associated with the single input port, second N ports and a single output port associated with the second N ports, wherein Nis coincident with the number of the fluidic modules. The single input port is fluidically connected to the fluid distribution network; the first N ports are fluidically connected to input ports of the plurality of fluidic modules, respectively; the second N ports are fluidically connected to output ports of the plurality of fluidic modules, respectively; the single output port is fluidically connected to the fluid collection and sampling network.

In one embodiment, each pair of the plurality of fluidic modules recapitulates vascular and stromal or luminal and abluminal sides of a barrier bioreactor, wherein the vascular and stromal or luminal and abluminal sides are separated by a semipermeable membrane that supports endothelial and/or epithelial cells to recapitulate barrier function.

In another aspect of the invention, a fluidic system comprises a systemic circulation and mixing reservoir, a main flow bus, a main pump, a balance flow bus, and a return flow bus fluidically coupled to one another in series, creating a fluidic loop therewith; a delivering means fluidically coupled to the main pump; and a plurality of fluidic modules, each fluidic module having an input port fluidically coupled to the delivering means, and an output port fluidically coupled to the return flow bus. In operation, the main pump withdraws media from the systemic circulation and mixing reservoir and delivers the media to the delivering means that in turn delivers the media to the plurality of fluidic modules individually, and then the effluent of the plurality of fluidic modules is delivered to the systemic circulation and mixing reservoir through the return flow bus.

In one embodiment, each fluidic module comprises wells in a well plate, organ- or organoid-chips, bioreactors, or other bio-objects.

In one embodiment, the delivering means comprises a multichannel module pump configured to individually provide fluid to each fluidic module at a same or different flow rate, so that each fluidic module is perfused with a 100% duty cycle.

In one embodiment, the delivering means comprises a network pump fluidically coupled to the main pump, and a module selector valve fluidically coupled between the network pump and the plurality of fluidic modules for individually and selectively perfusing one of the plurality of fluidic modules.

In one embodiment, the fluidic system further comprises a replacement media reservoir, and a sampling/make-up pump fluidically coupled between the replacement media reservoir and the systemic circulation and mixing reservoir.

In one embodiment, the module selector valve is a multichannel selector valve.

In one embodiment, the module selector valve is a single 2×N channel module selector valve having a single input port, first N ports associated with the single input port, second N ports and a single output port associated with the second N ports, wherein N is coincident with the number of the fluidic modules. The single input port is fluidically connected to the network pump; the first N ports are fluidically connected to the input ports of the plurality of fluidic modules, respectively; the second N ports are fluidically connected to the output ports of the plurality of fluidic modules, respectively; and the single output port is fluidically connected to the return flow bus.

In one embodiment, the fluidic system further comprises a cut-in valve fluidically coupled between the output ports of the plurality of fluidic modules and the second N port of the single 2×N channel module selector valve, for selecting which fluidic module output is being sampled while all of the other fluid flows are unperturbed.

In one embodiment, the fluidic system further comprises a replacement media reservoir and a sample collection vial, and a sample/make-up pump fluidically coupled between the cut-in valve and the replacement media reservoir and the sample collection vial.

In one embodiment, the fluidic system further comprises second and third valves and an analysis pump for sending media aliquots to one or more analyzers, wherein the second valve is fluidically coupled between the cut-in valve and calibration and rinse ports, the analysis pump is fluidically coupled between the second valve and the third valve that is in turn fluidically coupled to the one or more analyzers.

In one embodiment, the plurality of fluidic modules is accessible in sequence, or randomly.

In yet another aspect of the invention, a fluidic system comprises at least one microformulator for mixing media that is stored in drug, reagent, and toxin vials for delivery; a recirculation pump fluidically coupled to the at least one microformulator, and a sample collection pump; and a plurality of fluidic modules fluidically coupled between the recirculation pump and the sample collection pump, such that both sides of each fluidic module are operably independent of any of the other fluidic modules. In operation, the recirculation pump withdraws the media from the at least one microformulator and delivers the media to the plurality of fluidic modules, and then the effluent of the plurality of fluidic modules is withdrawn by the sample collection pump.

In one embodiment, the fluidic system further comprises a multichannel valve fluidically coupled to the sample collection pump for selectively directing the effluent to one or more sample collection vials.

In one embodiment, the plurality of fluidic modules comprises two-chamber barrier bioreactors with each having vascular/luminal and stromal/abluminal reservoirs, and each bioreactor chamber has its own recirculation reservoir.

In one embodiment, no interconnection is made between any of these chambers, except when the at least one microformulator is operated in reverse so that media is drawn from one chamber, stored in either fluid line or vial, and then delivered to another chamber.

In one embodiment, the fluidic system is capable of controlling the perfusion and interaction of numerous organ-on-chip, organoid, or other bio-object modules while allowing sampling from each module, controlling module-module communication, and maintaining overall functional fluid volumes.

In a further aspect of the invention, a fluidic system comprises an input reservoir plate; at least one microformulator for providing media that is delivered to the input reservoir plate; a chemostat plate comprising an array of chemostats fluidically coupled to the at least one microformulator for continuous delivery of the media from the input reservoir plate to each chemostat; and an output module fluidically coupled to the chemostat plate for real-time analysis and sampling.

In one embodiment, each of the at least one microformulators comprises: a plurality of reservoirs; at least one input selector valve fluidically coupled to the plurality of reservoirs to select at least one reservoir; at least one output director valve fluidically coupled to the input reservoir plate; and at least one pump fluidically coupled between the at least one input selector valve and the at least one output director valve for withdrawing fluid from the selected reservoir through the at least one input selector valve and delivering it to the input reservoir plate through the at least one output director valve.

In one embodiment, the at least one input selector valve is configured to select different reservoirs at different periods of time.

In one embodiment, the at least one pump is driven such that the fluid of the selected reservoir outputs from the at least one output director valve at a predetermined flow rate.

In one embodiment, the predetermined flow rate varies with time.

In one embodiment, the at least one input selector valve is a multichannel input selector valve, the at least one pump is a single-channel pump, and the at least one output director valve is a multichannel output director valve.

In one embodiment, through a sequence of selecting a plurality of reservoirs by the at least one input selector valve and pump speed and duration actuations of the at least one pump, the media is provided to have a different time-varying perfusion mixture for each chemostat.

In one embodiment, each of the at least one microformulators further comprises a single-channel optical sensing module coupled between the at least one pump and the at least one output director valve for tracking an intentionally injected bubble for measurement of flow rate, or identifying when a reservoir is emptied.

In one embodiment, the fluidic system further comprises at least one first multichannel pump fluidically coupled between the input reservoir plate and the chemostat plate, and at least one second multichannel pump fluidically coupled between the chemostat plate and the output module.

In one embodiment, the input reservoir plate has two sets of media ports, and wherein at least one first multichannel pump comprises two first multichannel pumps, each first multichannel pump is fluidically coupled between a respective set of the media ports and the chemostat plate, such that one set is refillable while the other set is being delivered by a corresponding pump to each chemostat in the chemostat plate, providing uninterrupted perfusion.

In one embodiment, at least one second multichannel pump comprises two second multichannel pumps.

In one embodiment, the output module comprises an analyzer, wherein the fluidic system further comprises at least one output valve fluidically coupled between one of the two second multichannel pumps and the analysis module.

In one embodiment, the output module further comprises an output plate fluidically coupled to another of the two second multichannel pumps.

In one embodiment, the effluent from each chemostat is collected by the at least one second pump and delivered to the at least one output valve.

In one embodiment, the at least one output valve either delivers the effluent from each chemostat to a separate well in an output plate, or allows each effluent line, one at a time, to be diverted to the analyzer.

In one embodiment, the effluent from all the chemostats is diverted to waste to ensure continuous perfusion when no sample is needed or the output plate is removed after bulk sample collection.

In one embodiment, the analyzer is equipped with a spiral microfluidic sorter, a filter, or tangential flow filtration for real-time separation of cells from media, and an in-line, microfluidic acoustic or electrical lyser.

In one embodiment, the chemostats are operably inoculated by using an external pipettor or robot to seed either the chemostat plate, which is removable, or a transfer plate that has one or more seeded wells and is then installed in place of the output plate with the at least one second pump run in reverse to deliver the selected cells into various chemostats to restart their culture.

In one embodiment, the chemostat plate is operably implemented in a well plate.

In one embodiment, the fluidic system further comprises a plurality of multichannel optical sensing modules.

In one embodiment, a first one of the multichannel optical sensing modules is coupled between the at least one first multichannel pump and the chemostat plate, and a second one of the multichannel optical sensing modules is coupled between the chemostat plate and the at least one second multichannel pump for measuring $PO_2$, $PCO_2$, pH, and/or optical density (OD) of the media entering and leaving each chemostat, respectively.

In one embodiment, a first one of the multichannel optical sensing modules is coupled between the at least one microformulator and the input reservoir plate, and a second one of the multichannel optical sensing modules is coupled between the input reservoir plate and the at least one first multichannel pump, and a third one of the multichannel optical sensing modules is coupled between the chemostat plate and the at least one second multichannel pump, for measuring $PO_2$, $PCO_2$, pH, and/or optical density (OD).

In one embodiment, the output module comprises two output plates, so that one output plate is fillable while the other output plate is being removed for separate analysis and immediate replacement with an empty plate.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIGS. 1A-1B: Batch culture with media replacement every 24 hours, which maximizes the change at the end of each 24-hour period, but subjects the cells to continuously changing nutrient and metabolite concentrations. FIGS. 1C-1D: Continuous media replacement with a microchemostat or a microformulator so that the cells maintain a consistent level of nutrients and metabolites. FIGS. 1A and 1D: Confluent, adherent cells in a well. The cells are no longer dividing. FIGS. 1B and 1C: Suspended, dividing yeast in a bioreactor. In all four cases, both the metabolite [Metab] (single-broken line) and the inhibitor [Inhib] (double-broken line) reduce the metabolic activity of the cells. Comparison of FIGS. 1A-1B with FIGS. 1C-1D shows how continuous flow provides a much more stable, readily interpreted environment for the cells.

FIGS. 2A-2C show schematic representation of key technologies associated with FIGS. 1A-1D. FIG. 2A: A conventional continuous-flow chemostat. FIG. 2B: The VIIBRE-developed microclinical analyzer that provides automated calibration of a multi-analyte electrochemical sensor. FIG. 2C: VIIBRE's multiwell microformulator, a straightforward application of the pumps, valves, and controllers in FIG. 2B, uses time-division multiplexing to deliver a different, realistic pharmacokinetic drug profile (inset) to each well of a 24-well plate, and can separately store samples from each well.

FIGS. 4A-4G show schematically a multi-port valve, according to certain embodiments of the invention.

DETAILED DESCRIPTION OF THE INVENTION

Figure 1A:
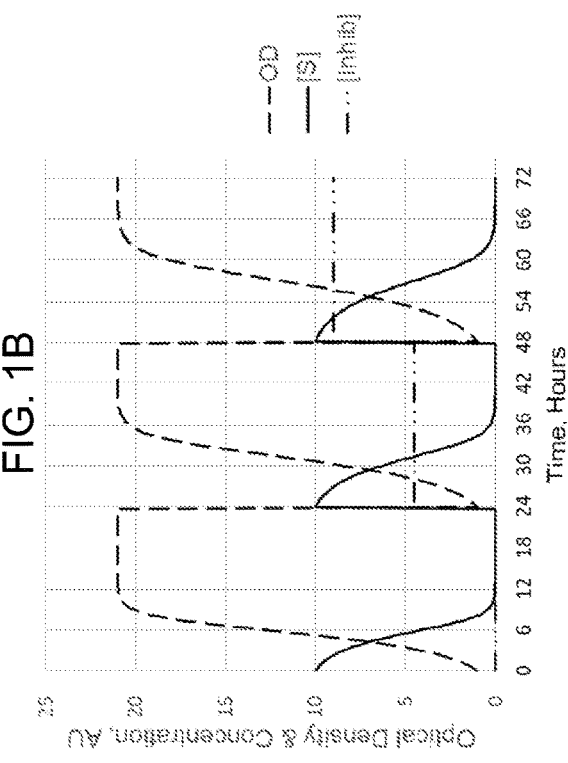
FIGS. 1A-1D show computer simulation of metabolic inhibition experiments using batch and continuous culture of adherent cells and dividing yeast.
Figure 1B:
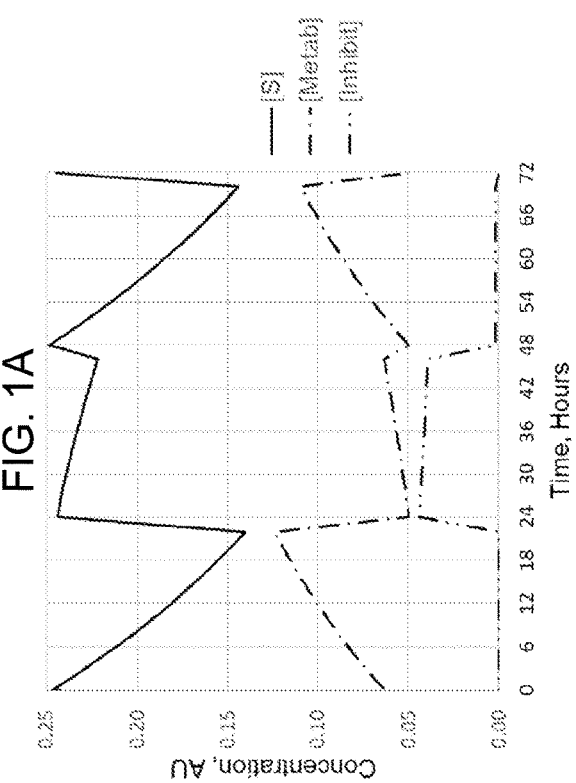
Figure 1C:
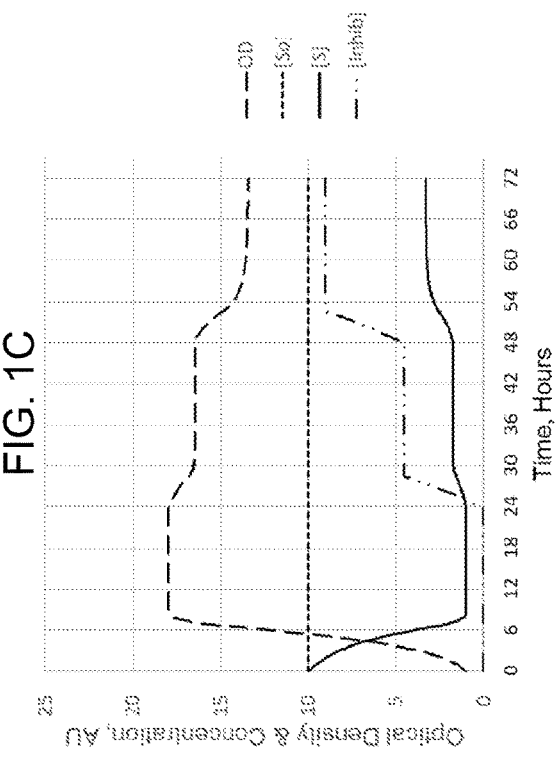
Figure 1D:
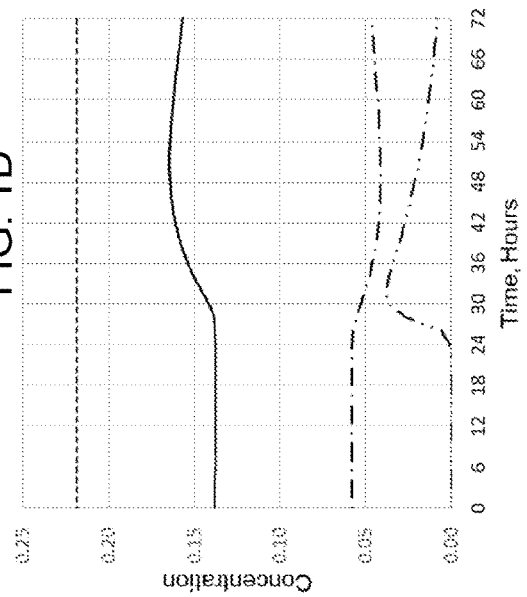

The invention will now be described more fully hereinafter with reference to the accompanying drawings, in which exemplary embodiments of the invention are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting and/or capital letters has no influence on the scope and meaning of a term; the scope and meaning of a term are the same, in the same context, whether or not it is highlighted and/or in capital letters. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below can be termed a second element, component, region, layer or section without departing from the teachings of the invention.

It will be understood that when an element is referred to as being "on," "attached" to, "connected" to, "coupled" with, "contacting," etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" to another feature may have portions that overlap or underlie the adjacent feature.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," or "includes" and/or "including" or "has" and/or "having" when used in this specification specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation shown in the figures. For example, if the device in one of the figures is turned over, elements described as being on the "lower" side of other elements would then be oriented on the "upper" sides of the other elements. The exemplary term "lower" can, therefore, encompass both an orientation of lower and upper, depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around," "about," "substantially" or "approximately" shall generally mean within 20 percent, preferably within 10 percent, and more preferably within 5 percent of a given value or range. Numerical quantities given herein are approximate, meaning that the terms "around," "about," "substantially" or "approximately" can be inferred if not expressly stated.

As used herein, the terms "comprise" or "comprising," "include" or "including," "carry" or "carrying," "has/have" or "having," "contain" or "containing," "involve" or "involving" and the like are to be understood to be open-ended, i.e., to mean including but not limited to.

As used herein, the phrase "at least one of A, B, and C" should be construed to mean a logical (A or B or C), using a non-exclusive logical OR. As used herein, the term "and/or" includes any and all combinations of one or more of the associated listed items.

The description below is merely illustrative in nature and is in no way intended to limit the invention, its application, or uses. The broad teachings of the invention can be implemented in a variety of forms. Therefore, while this invention includes particular examples, the true scope of the invention should not be so limited since other modifications will become apparent upon a study of the drawings, the specification, and the following claims. For purposes of clarity, the same reference numbers will be used in the drawings to identify similar elements. It should be understood that one or more steps within a method may be executed in different order (or concurrently) without altering the principles of the invention.

This invention is motivated by the need to operate large arrays of isolated or coupled organ chips, bioreactors, chemostats and other perfused bio-objects with a level of fluidic control and parallelism that goes beyond that of existing capabilities. There are several examples of using microfluidics to couple a plurality of organ chips, and to integrate organ-chip systems with multiple organs. In many of these, there may be a port for sampling media withdrawn from a common reservoir, or a means to sample media from the effluent of each organ chip or microbioreactor, but there have yet to be any common means that would allow a portion of the effluent from any bioreactor to be sent to a common analytical instrument while the effluent from all other bioreactors flows without interruption.

In practice, the fluidic operations in well plates, organoid-, organ- and tissue-microbioreactors, and other perfused bio-objects are performed either in parallel, as with a multi-head pipetting robot, or in series, with sequential operations performed on each well or microbioreactor or bio-object. There do not currently exist technologies to allow simultaneous serial and parallel access to a plurality of coupled or independent bioreactors, chemostats, or other bio-objects for real time sensing and control. There is a need to run inexpensive, massively parallel biological experiments for pharmacology, toxicology, and basic biology. However, in order to understand the outcomes of these massively parallel experiments, it is necessary to analyze the media or cells or other measures of experimental output with one or more expensive analytical instruments that cannot be parallelized, for example high-speed liquid chromatography-ion mobility mass spectrometer (LC-IM-MS) systems. Because of the high cost of such instruments, they cannot be readily parallelized, and it is necessary to take samples from multiple wells, bioreactors or other bio-objects that are operated in parallel and serialize them for sequential analysis by a very limited number of expensive analytical platforms. One subject of this invention is the use of a multichannel microfluidic pumps and valves for this purpose.

The combinations of multichannel microfluidic pumps and valves described herein make it possible to sequence the initiation and readout of each of the massively parallel experiments such that all parallel experiments are analyzed in the sequence by which they were initiated, so that all of the plurality of parallel experiments are in fact analyzed at the very same time instance relative to the start of each experiment, thereby in effect using experimental timing to parallelize the application of a serial measurement instrument. As an example, the speed with which a serialized, state-of-the-art analytical instrument can operate, such as the 10 second measurement time of a solid phase extraction (SPE) ion mobility mass spectrometer (SPE-IM-MS), can enable daily measurement of the untargeted metabolomic signature of 8,640 parallel experiments. However, this requires the careful interconnection and coordination of multichannel pumps and valves, as described in this disclosure.

Similarly, the creation of individual media compositions for a large number of parallel experiments can be performed by a microformulator that has access to a plurality of reagents and other fluids and can produce the desired media solutions upon demand. But the cost, complexity, required reagent access for a microformulator, and the intervals of time often available to formulate solutions prior to delivery suggest that it should not in itself be parallelized. However, if a parallel reservoir plate is used to accumulate the plurality of media formulations required for the subsequent use by a plurality of parallel experiments, then the formulation process can be serialized while the experiments remain parallelized.

The conversion of series-to-parallel and parallel-to-series fluidic operations is functionally equivalent to electronic data processing and communications, where multiple computer processors operating in parallel utilize serialized communication rather than attempting to have massively parallel connections between two processors. In long-distance telecommunications, the processes of signal multiplexing and demultiplexing allow the time-division transmission of multiple multiplexed, low-bandwidth messages over a single, high-bandwidth channel, with subsequent demultiplexing to recreate the set of individual messages at a distant location.

According to the invention, the automated multichannel pumps and valves enable the seamless parallelization of serial fluidic operations, and the serialization of fluidic operations that would otherwise best be performed in parallel. The combination of multichannel pumps and valves can accomplish such series-to-parallel and parallel-to-series fluidic operations.

In one aspect, the invention relates to a fluidic system. The fluidic system includes a fluid distribution network, and a fluid collection and sampling network; a plurality of fluidic modules fluidically coupled between the fluid distribution network and the fluid collection and sampling network in parallel; a systemic circulation and mixing reservoir; and a first pump, and a second pump, wherein the first pump is fluidically coupled between the systemic circulation and mixing reservoir and the fluid distribution network for withdrawing media from the systemic circulation and mixing reservoir and delivering the media to the fluid distribution network; and wherein the second pump is fluidically coupled between the fluid collection and sampling network and a sample vial for withdrawing effluent of the plurality of fluidic modules from the fluid collection and sampling network and delivering the effluent to one or more sample vials.

In some embodiments, each fluidic module comprises wells in a well plate, organ- or organoid-chips, bioreactors, or other bio-objects.

In some embodiments, the second pump is further fluidically coupled between the fluid collection and sampling network and a replacement media reservoir to withdraw make-up media from the replacement media reservoir and inject it into the fluid collection and sampling network to replace what is removed therefrom for sampling.

In some embodiments, the fluid collection and sampling network is fluidically coupled to the systemic circulation and mixing reservoir so that a return flow bus delivers media back to the systemic circulation and mixing reservoir.

In some embodiments, the second pump is a two-channel sampling and make-up pump.

In some embodiments, the fluidic system further comprises a balance flow bus fluidically coupled between the first pump and the fluid collection and sampling network; and a network pump fluidically coupled between the first pump and the fluid distribution network.

In some embodiments, the fluidic system further comprises an upstream throttling valve fluidically coupled between the fluid distribution network and the plurality of fluidic modules for selectively controlling different flow through different fluidic modules.

In some embodiments, the fluidic system further includes a downstream throttling valve fluidically coupled between the plurality of fluidic modules and the fluid collection and sampling network for completely isolating one or more fluidic modules from the others, and/or separately regulating flow and pressure in each fluidic module.

In some embodiments, each of the upstream throttling valve and the downstream throttling valve is a multichannel selector valve.

In some embodiments, both the upstream throttling valve and the downstream throttling valve comprise a single 2×N channel module selector valve having a single input port, first N ports associated with the single input port, second N ports and a single output port associated with the second N ports, wherein N is coincident with the number of the fluidic modules. The single input port is fluidically connected to the fluid distribution network; the first N ports are fluidically connected to input ports of the plurality of fluidic modules, respectively; the second N ports are fluidically connected to output ports of the plurality of fluidic modules, respectively; the single output port is fluidically connected to the fluid collection and sampling network.

In some embodiments, each pair of the plurality of fluidic modules recapitulates the vascular and stromal or luminal and abluminal sides of a barrier bioreactor, wherein the vascular and stromal or luminal and abluminal sides are separated by a semipermeable membrane that supports endothelial and/or epithelial cells to recapitulate barrier function.

In another aspect of the invention, a fluidic system comprises a systemic circulation and mixing reservoir, a main flow bus, a main pump, a balance flow bus, and a return flow bus fluidically coupled to one another in series, creating a fluidic loop therewith; a delivering means fluidically coupled to the main pump; and a plurality of fluidic modules, each fluidic module having an input port fluidically coupled to the delivering means, and an output port fluidically coupled to the return flow bus. In operation, the main pump withdraws media from the systemic circulation and mixing reservoir and delivers the media to the delivering means that in turn delivers the media to the plurality of fluidic modules individually, and then the effluent of the plurality of fluidic modules is delivered to the systemic circulation and mixing reservoir through the return flow bus.

In some embodiments, each fluidic module comprises wells in a well plate, organ- or organoid-chips, bioreactors, or other bio-objects.

In some embodiments, the delivering means comprises a multichannel module pump configured to individually provide fluid to each fluidic module at a same or different flow rate, so that each fluidic module is perfused with a 100% duty cycle.

In some embodiments, the delivering means comprises a network pump fluidically coupled to the main pump, and a module selector valve fluidically coupled between the network pump and the plurality of fluidic modules for individually and selectively perfusing one of the plurality of fluidic modules.

In some embodiments, the fluidic system further comprises a replacement media reservoir, and a sampling/make-up pump fluidically coupled between the replacement media reservoir and the systemic circulation and mixing reservoir.

In some embodiments, the module selector valve is a multichannel selector valve.

In some embodiments, the module selector valve is a single 2×N channel module selector valve having a single input port, first N ports associated with the single input port, second N ports and a single output port associated with the second N ports, wherein N is coincident with the number of the fluidic modules. The single input port is fluidically connected to the network pump; the first N ports are fluidically connected to the input ports of the plurality of fluidic modules, respectively; the second N ports are fluidically connected to the output ports of the plurality of fluidic modules, respectively; and the single output port is fluidically connected to the return flow bus.

In some embodiments, the fluidic system further comprises a cut-in valve fluidically coupled between the output ports of the plurality of fluidic modules and the second N port of the single 2×N channel module selector valve, for selecting which fluidic module output is being sampled while all of the other fluid flows are unperturbed.

In some embodiments, the fluidic system further comprises a replacement media reservoir and a sample collection vial, and a sample/make-up pump fluidically coupled between the cut-in valve and the replacement media reservoir and the sample collection vial.

In some embodiments, the fluidic system further comprises second and third valves and an analysis pump for sending media aliquots to one or more analyzers, wherein the second valve is fluidically coupled between the cut-in valve and calibration and rinse ports, the analysis pump is fluidically coupled between the second valve and the third valve that is in turn fluidically coupled to the one or more analyzers.

In some embodiments, the plurality of fluidic modules is accessible in sequence, or randomly.

In yet another aspect of the invention, a fluidic system comprises at least one microformulator for mixing media that is stored in drug, reagent, and toxin vials for delivery; a recirculation pump fluidically coupled to the at least one microformulator, and a sample collection pump; and a plurality of fluidic modules fluidically coupled between the recirculation pump and the sample collection pump, such that both sides of each fluidic module are operably independent of any of the other fluidic modules. In operation, the recirculation pump withdraws the media from the at least one microformulator and delivers the media to the plurality of fluidic modules, and then the effluent of the plurality of fluidic modules is withdrawn by the sample collection pump.

In some embodiments, the fluidic system further comprises a multichannel valve fluidically coupled to the sample collection pump for selectively directing the effluent to one or more sample collection vials.

In some embodiments, the plurality of fluidic modules comprises two-chamber barrier bioreactors with each having vascular/luminal and stromal/abluminal reservoirs, and each bioreactor chamber has its own recirculation reservoir.

In some embodiments, no interconnection is made between any of these chambers, except when the at least one microformulator is operated in reverse so that media is drawn from one chamber, stored in either fluid line or vial, and then delivered to another chamber.

In some embodiments, the fluidic system is capable of controlling the perfusion and interaction of numerous organ-on-chip, organoid, or other bio-object modules while allowing sampling from each module, controlling module-module communication, and maintaining overall functional fluid volumes.

In a further aspect of the invention, a fluidic system comprises an input reservoir plate; at least one microformulator for providing media that is delivered to the input reservoir plate; a chemostat plate comprising an array of chemostats fluidically coupled to the at least one microformulator for continuous delivery of the media from the input reservoir plate to each chemostat; and an output module fluidically coupled to the chemostat plate for real-time analysis and sampling.

In some embodiments, each of the at least one microformulators comprises: a plurality of reservoirs; at least one input selector valve fluidically coupled to the plurality of reservoirs to select at least one reservoir; at least one output director valve fluidically coupled to the input reservoir plate; and at least one pump fluidically coupled between the at least one input selector valve and the at least one output director valve for withdrawing fluid from the selected reservoir through the at least one input selector valve and delivering it to the input reservoir plate through the at least one output director valve.

In some embodiments, the at least one input selector valve is configured to select different reservoirs at different periods of time.

In some embodiments, the at least one pump is driven such that the fluid of the selected reservoir outputs from the at least one output channel at a predetermined flow rate.

In some embodiments, the predetermined flow rate varies with time.

In some embodiments, the at least one input selector valve is a multichannel input selector valve, the at least one pump is a single-channel pump, and the at least one output director valve is a multichannel output director valve.

In some embodiments, through a sequence of selecting a plurality of reservoirs by the at least one input selector valve and pump speed and duration actuations of the at least one pump, the media is provided to have a different time-varying perfusion mixture for each chemostat.

In some embodiments, each of the at least one microformulators further comprises a single-channel optical sensing module coupled between the at least one pump and the at least one output director valve for tracking an intentionally injected bubble for measurement of flow rate, or identifying when a reservoir is emptied.

In some embodiments, the fluidic system further comprises at least one first multichannel pump fluidically coupled between the input reservoir plate and the chemostat plate, and at least one second multichannel pump fluidically coupled between the chemostat plate and the output module.

In some embodiments, the input reservoir plate has two sets of media ports, and wherein at least one first multichannel pump comprises two first multichannel pumps, each first multichannel pump is fluidically coupled between a respective set of the media ports and the chemostat plate, such that one set is refillable while the other set is being delivered by a corresponding pump to each chemostat in the chemostat plate, providing uninterrupted perfusion.

In some embodiments, at least one second multichannel pump comprises two second multichannel pumps.

In some embodiments, the output module comprises an analyzer, wherein the fluidic system further comprises at least one output valve fluidically coupled between one of the two second multichannel pumps and the analysis module.

In some embodiments, the output module further comprises an output plate fluidically coupled to another of the two second multichannel pumps.

In some embodiments, the effluent from each chemostat is collected by the at least one second pump and delivered to the at least one output valve.

In some embodiments, the at least one output valve either delivers the effluent from each chemostat to a separate well in an output plate, or allows each effluent line, one at a time, to be diverted to the analyzer.

In some embodiments, the effluent from all the chemostats is diverted to waste to ensure continuous perfusion when no sample is needed or the output plate is removed after bulk sample collection.

In some embodiments, the analyzer is equipped with a spiral microfluidic sorter, a filter, or tangential flow filtration for real-time separation of cells from media, and an in-line, microfluidic acoustic or electrical lyser.

In some embodiments, the chemostats are operably inoculated by using an external pipettor or robot to seed either the chemostat plate, which is removable, or a transfer plate that has one or more seeded wells and is then installed in place of the output plate with the at least one second pump run in reverse to deliver the selected cells into various chemostats to restart their culture.

In some embodiments, the chemostat plate is operably implemented in a well plate.

In some embodiments, the fluidic system further comprises a plurality of multichannel optical sensing modules.

In some embodiments, a first one of the multichannel optical sensing modules is coupled between the at least one first multichannel pump and the chemostat plate, and a second one of the multichannel optical sensing modules is coupled between the chemostat plate and the at least one second multichannel pump for measuring $PO_2$, $PCO_2$, pH, and/or optical density (OD) of the media entering and leaving each chemostat, respectively.

In some embodiments, a first one of the multichannel optical sensing modules is coupled between the at least one microformulator and the input reservoir plate, and a second one of the multichannel optical sensing modules is coupled between the input reservoir plate and the at least one first multichannel pump, and a third one of the multichannel optical sensing modules is coupled between the chemostat plate and the at least one second multichannel pump, for measuring $PO_2$, $PCO_2$, pH, and/or OD.

In some embodiments, the output module comprises two output plates, so that one output plate is fillable while the other output plate is being removed for separate analysis and immediate replacement with an empty plate.

To further illustrate the principles of the invention and their practical applications, certain exemplary embodiments of the invention are described below with reference to the accompanying drawings.

In certain aspects of this invention, advanced multichannel pumps and valves are utilized for series-parallel fluidic processing for multiple well-plate wells, organoid-, organ-, and tissue-chips, and other perfused bio-objects. FIGS. 3A-3K through 7A-7D provide overviews of each of the required components for the invention, including multichannel rotary planar valves and rotary planar peristaltic spiral pumps (FIGS. 3A-3K), a universal valve (FIG. 3F-3H), a 100-channel rotary planar valve (FIGS. 4A-4G), a 24-port analytical valve (FIGS. 5A-5G), a 24-port sensing valve (FIGS. 6A-6C), and a 12-channel cut-in valve (FIGS. 7A-7D). The fluidic circuits described in this invention can be implemented with a variety of different pumps and valves, with the ones presented here representing one means to support the functions offered by these circuits. These exemplary examples are not intended to limit the implementation of alternative embodiments of this invention in any way.

FIGS. 3A-3B are perspective and plan views of a circular through-plate 25-channel valve fluidic chip 301, showing an actuated surface, working channels 333, registration/alignment protrusions 306, and interface ports 307, according to one embodiment of the invention.

FIG. 3C shows an enclosed valve cartridge 300 according to one embodiment of the invention. This configuration utilizes the position data provided by motor encoder 339 to align a valve actuator 316 in order to open specific channels in the valve fluidic chip 301. The valve actuator 316 is a cylinder made from acetal resin or other material. Topography on the lower face of the valve actuator 316, such as a groove 317, pockets, or similar features, displaces balls 318 as the actuator 316 is rotated. The ball cage 319 constrains movements of the balls 318 to the vertical axis via holes 320 within which the balls reside. The ball cage 319 is constrained against interior faces of surrounding standoff plates/tabs/flanges 306, thereby preventing rotational or x-y translational movement of the ball cage 319 and the balls 318. The surrounding standoff plates/tabs/flanges 306 allow for multiple chip orientations while maintaining automatic and precise mechanical alignment. The balls 318 that are forced into the surface of the fluidic chip 301 compress the channel (not pictured here) in each ball's immediate proximity, thereby pinching off and closing those channels to fluid movement. The fluidic chip 301 is held in position by the openings 356 in the fluidics plate 340. FIG. 3D shows an expanded, exploded view of a 25-channel valve subassembly according to one embodiment of the invention.

Figure 3F:
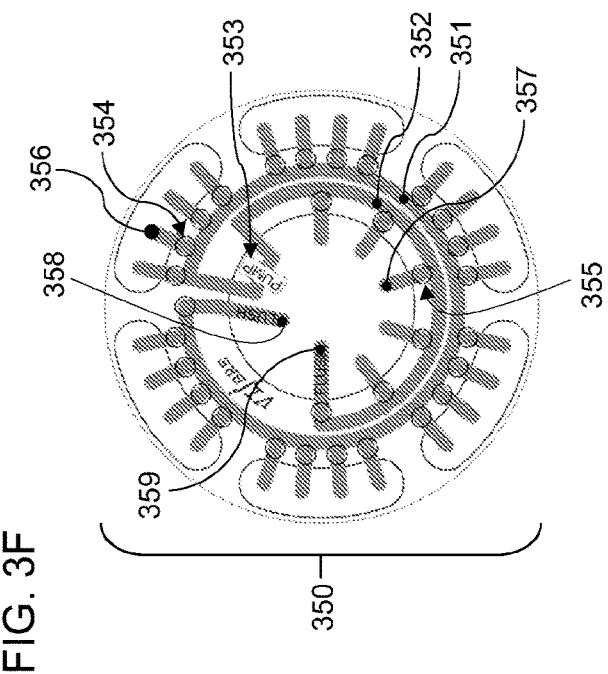
FIGS. 3A-3Q show schematically various valves and pumps, according to certain embodiments of the invention.
Figure 3H:
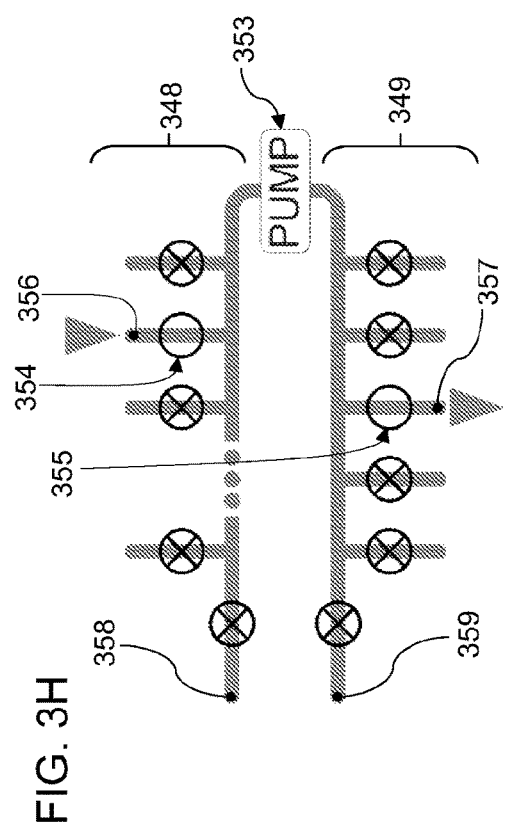
Figure 3E:
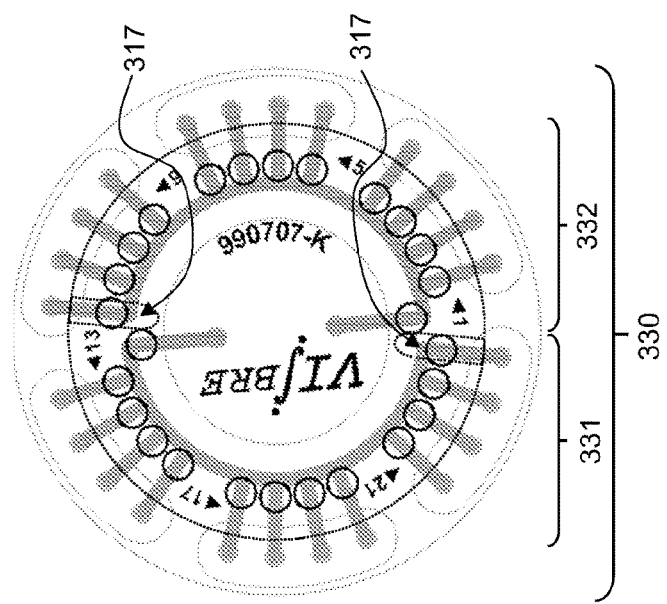

Just as FIGS. 3A-3B show a 25-channel valve that can be used to deliver a selected media or drug to a bioreactor or chemostat, a single 2×12-port perfusion/collection valve 330 shown in FIG. 3E according to one embodiment of the invention may be employed to deliver media to each side of a two-chambered bioreactor or connect simultaneously to both the upstream and downstream ports of a bioreactor or chemostat. In another embodiment, this valve's integrated channel network is divided into two ganged halves 331 and 332, with 12 outlet ports upstream from N=12 bioreactors, and 12 downstream collection ports. The downstream network 331 collects individually the media that perfuses each of the 12 bioreactors. The channels within this valve 330 are opened in port-pairs; that is, for example, Port 5 would be connected to the outlet port via its corresponding common channel at the same time that Port 17 is opened to the collection port via its respective common channel. Similarly, Ports 12 and 24 are activated concurrently, as shown by the location of the actuator groove 317 in FIG. 3E, and so on. For any given active port-pair, the remaining ports are closed to flow, and the connected modules would see no net movement of fluid therethrough. The configuration of the valve 330 enables time-division multiplexing to control the relative perfusion of each of N≤12 modules. In one embodiment shown in FIG. 3E, the 12th and 24th ports in the valve can be used to flush the common channels if desired.

Figure 3G:
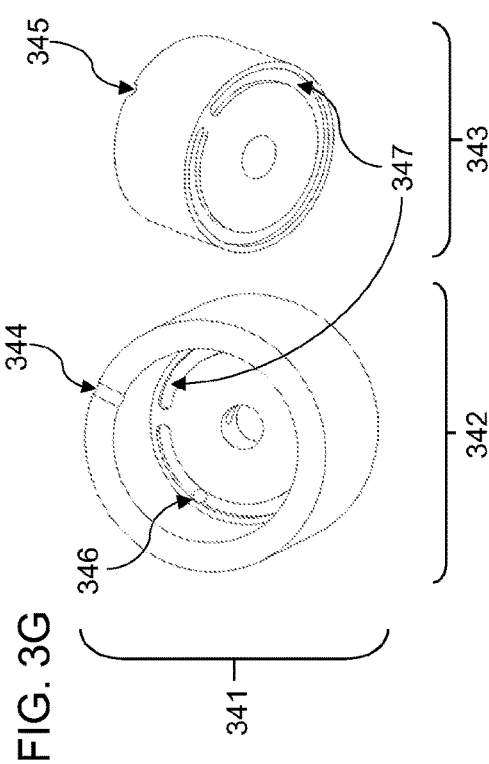

FIGS. 3F-3H show a universal valve chip 350 as used with a lagging actuator assembly 341, a combination which allows independent selection of both collection source and destination sink using a single valve construct with a single motor, according to embodiments of the invention. Two fluidic buses (common channels) 348 and 349 are connected by an offboard pump 353. Alternatively, if passive gravity-driven flow is desired, or if individual pumps are to be used inline either upstream or downstream of the valve chip 350, a shunt (not shown) may be installed in lieu of the pump 353. A schematic diagram of the fluidic control network shown in FIG. 3F is clarified by FIG. 3H.

Depending on the direction in which the pump 353 is operating, either bus 348/349 may serve as a collection conduit or an output conduit, while the other bus 349/348 serves as output or collection, respectively. In the exemplary embodiment shown in FIG. 3H, where the arrows indicate fluid flow, the bus 348 is the collection conduit and the bus 349 is the output conduit, but these could be switched. Ports 358 and 359 may serve as flush ports to clear common channels (buses) 351 and 352, or may be used as additional analyte ports. Additional ports and corresponding connecting channels may be added to (or removed from) the buses 348 and 349.

The lagging actuator assembly 341, as shown in FIG. 3G, is used to select one collection port 356 and one output port 357. This is accomplished when the actuator groove 344 in the driving actuator 342 aligns with the actuating element 354, and the actuating groove 345 in the driven actuator 343 aligns with the actuating element 355. When the grooves 344 and 345 align with the actuating elements 354 and 355, respectively, those actuating elements 354 and 355 relax, and the corresponding port 356/357 is connected to the common channel of its respective bus 348/349, and thereby selected ports 356 and 357 become connected to each other. In this embodiment, one actuating element 354/355 in each bus 348/349 opens while all other actuating elements remain pressed into their corresponding regions, and those channels remain pinched closed.

In the present embodiment, the lagging actuator 341 has ample backlash such that any permutation of port-pair interconnections can be achieved. This backlash is accomplished by circular-segment pockets 347 with a near—360° sweep, and a single limiting ball 346, whose motion is constrained by the pockets 347, allowing the driving actuator 342 and the driven actuator 343 to rotate or remain stationary independently until the limiting ball 346 contacts opposing ends of both pockets 347, at which point both actuator parts 342 and 343 rotate as one. When the direction of the driving motor is then reversed, the motion of each actuator 342/343 becomes independent again. The sum of the pocket arc-lengths equals the backlash of the actuator assembly (not accounting for ball diameter), and hence the sum of the arc lengths for the ball motion in the pockets 347 should not be less than 360°.

In the embodiment shown in FIG. 3G, the outer actuator 342 is the driving actuator, and time-division multiplexing of solution in conduits attached to the outer bus 348 may be readily achieved, as described previously. In other embodiments, the driving actuator and the driven actuator may manifest such that the inner actuator 343 drives the outer actuator 342. By this means, time-division multiplexing may be readily achieved on the inner fluidic bus 349.

In additional embodiments of this invention, the actuator assembly concept may be extrapolated to include more than the two actuating "rings," which would address additional fluidic buses. The mechanical function of such embodiments would operate similar to the combination lock mechanism on an old-fashioned safe; that is, the primary actuator would drive the secondary actuator, which in turn would drive subsequent subordinate actuators in a cascading fashion.

Perfusate circulation within the systems used to perfuse bioreactors, and organ- and organoid-chips may be gravity-driven or may be actively accomplished using external or on-chip pumps. The pumps used to move fluids can be a single-channel spiral pump 329A in FIG. 3I according to one embodiment of the invention, which includes a single spiral channel 362. The pump actuator (not shown) captures the 12 balls 364 and upon rotation drives them along a circular path 380 in FIG. 3K. The fact that the channel 362 in FIG. 3K is compressed in at least one location that progresses around the fluidic chip as the actuator rotates produces peristaltic pumping action. When the pump is used for bioreactor recirculation, media flows continuously through the circuit (of which the single spiral channel 362 is a part) at whatever rate is required to recapitulate a physiological residence time in each fluidic model. For pumped rather than gravity perfusion of a two-chamber bioreactor, a two-channel pump 329B shown in FIG. 3J can be used, according to one embodiment of the invention, which includes two spiral channels 362 and 363. The actuator balls 362 compress both spiral channels equivalently and produce simultaneous, matched peristaltic pumping action in both channels.

Figure 3J:
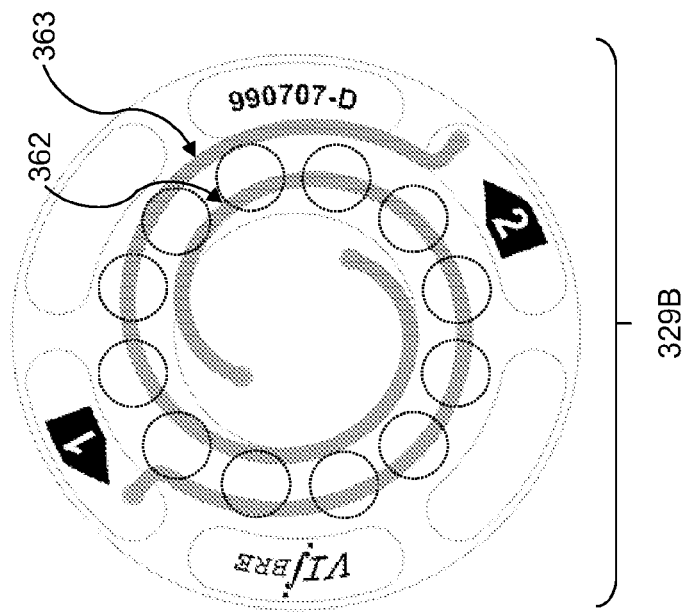
Figure 3I:
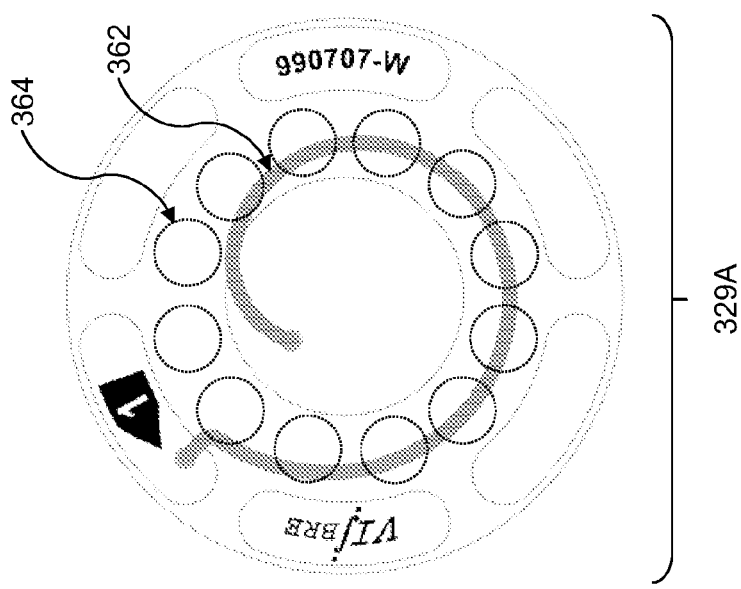

When used for media-replacement associated with media withdrawal for analysis, the two-channel spiral pump 329 shown in FIG. 3J with spiral channels 362 and 363 ensures that whatever volume of media is withdrawn from a bioreactor chamber for sampling is made up with media withdrawn from a replacement reservoir. Not shown, a 1×25 port valve as in FIG. 3B at the output of any pump could direct the sample to any well in a 24-well plate, with the 25th port being used to flush the pump and valve to prevent mixing of samples from different chambers.

FIGS. 3K-3Q show a spiral pump according to certain embodiments of the invention. Specifically, FIG. 3K shows a through-plate elastomeric fluidic chip as a single-channel spiral peristaltic pump 360, which may be used as the fluidic chip 301 in FIGS. 3C-3D. The through-plate elastomeric fluidic chip 301 has six outer protrusions 306 and a single inner protrusion 371 that align and hold the chip 301 in a support plate (340 in FIGS. 3C and 3D). The tubing ports 307 are within the protrusions 306. These protrusions 302 and 371 are optional and are used for convenience here to combine the functions of mechanical positioning and tubing ports and do not affect the operation or performance of the described spiral pump. The microfluidic channel 362 has an outer end 361 that connects to a tubing port within one of the outer protrusions 302, and an inner end 369 that connects to a tubing port in the inner protrusion 371. A multiple-ball rolling ball actuator (in the location of the actuator assembly 316 in FIGS. 3C and 3D) compresses a circular zone 380 that crosses a segment of the spiral fluidic channel 362 at point 325. As the ball actuator continues to move, in this example counterclockwise, the channel 362 is fully collapsed by the compression zone, and the dots 365 represent the sequential positions of the compression zone of one of the many balls 364 in the actuator, as shown at the location "A" to "F" of maximum channel compression at sequential instants of time, as indicated by the six section lines in FIG. 3K and the sectional views in FIG. 3L. At location A, the channel 362 is fully compressed, as shown by 372 in FIGS. 3L and 3M, and blocks the flow of fluid. The point moves as the actuator rotates. In this example, the pumping of the channel 362 is from the outer end 361 to the inner end 369 (through points A to F), and at the point F, the ball being tracked no longer compresses the channel 362 so that it relaxes to its native dimensions (377, FIG. 3M). As the balls travel along their circular path, the fluid is trapped between the travelling compression zones and moves along the channels, because beneath each ball in the compression zone the cross-sectional area of the channel 362 will be less than the relaxed value given by the native dimensions of the channel 377 (FIG. 3M). As the balls move out of the compression zone, the trapped fluid will be gradually released towards the channel outlet 369. If the dots A-F were to represent separate balls rather than a single ball being tracked with time, each of the compression zones A-to-B, B-to-C, C-to-D, D-to-E, and E-to-F acts as a travelling fluidic capacitor that absorbs pressure and volume changes, while the incomplete compression zones between the dots (C, D, E) act as resistors in a series comprising resistor-capacitor low-pass filters that move along the spiral channel and significantly attenuate the fluctuations normally associated with a peristaltic pump. A similar filtering effect occurs to minimize reflected input fluctuations as the channel enters the compression zone between 361 and AA'. The exact spiral shape of the spiral channel 362, its size relative to the actuator, and the diameter and spacing between the balls in the rolling ball actuator will determine the low-pass filter characteristics of the spiral pump. The gradual restoration of the compressed channel shape depicted in FIGS. 3L and 3M as the actuator balls roll away from the channel contributes to the gradual, smooth release of the fluid trapped between the ball compression zones. While in this example the actuator is rotating counterclockwise to pump from the outer end 361 to the inner end 369, the device may also function in reverse, pumping from 369 to 361 with clockwise actuator rotation. In certain embodiments, the parameters that describe the curvature of the spiral can be adjusted to minimize output pulsations preferably for one direction of motion. A different parameterization could optimize the performance for the opposite direction of rotation.

Given that only a small fraction of the area of the fluidic chip 301 is occupied by the spiral channels and only one outer protrusion 302 contains a tubing port 361, in certain embodiments, it is possible to add channels to the fluidic chip 301, as shown in FIGS. 3N (6 channels) and 3O (12 channels), with the corresponding 6 and 12 tubing ports respectively on the inner protrusion 371. Further, given that all the channels in either FIG. 3N or 3O will produce identical flow rates, within manufacturing tolerances, half of the channels could be used to deliver fluid to one side of a sealed barrier bioreactor, for example a neurovascular unit (NVU) on a chip, and the other half used to deliver fluid to the other side of the barrier. Thus, the six-channel chip in FIG. 3N could use a single motor and actuator to perfuse both sides of three two-chamber NVUs. Alternatively, the matched pumping channels could ensure that the same amount of fluid that was delivered to the input of a bioreactor was removed from the other, to minimize pressurized flow across the barrier, in the form of a push-pull pump pair, and the 12-channel pump in FIG. 3O could do push-pull perfusion of both sides of three NVU bioreactors. While a constant level of fluid in an open reservoir could be maintained by pumping in the exact amount of fluid as is pumped out, in practice this is difficult to accomplish, as pump properties or local conditions vary over time. The inevitable mismatches could lead to a reservoir being emptied or overfilled. In certain embodiments, the channels in FIGS. 3N and 3O may alternate in their cross-sectional area; for example, using two different channel widths and/or depths, the pumping rate of the larger channels would be proportionally larger than the smaller channels, which allows a multichannel spiral pump to maintain a particular level of fluid 391 in multiple open bioreactors 390, as shown in FIG. 3P, since the level of fluid in the bioreactor would be set by the height of the withdrawal tube 393 that would be designed to pump fluid faster than the fluid delivered by input tube 392. Because the withdrawal channel pumps faster than the delivery channel, if the fluid level is higher than the bottom of the withdrawal tube 393, the level will drop because more fluid is being pumped out. If the fluid level is lower than the bottom of the withdrawal tube 393, the withdrawal tube 393 will pump air and the fluid level will rise, thereby regulating the fluid level.

FIG. 3Q shows a six-channel spiral pump that has a common central port. In this configuration, a clockwise rotation will deliver equal amounts of fluid to each of the outer ports, serving as a splitter that does not suffer from the inevitable imbalances that can occur with a passive splitter. Rotation in the counterclockwise direction will draw fluid from each of the outer ports and collect it at the inner one, for example to collect at identical rates effluent from multiple bioreactors and deliver it to a common reservoir or analytical instrument. In certain embodiments, not all channels/ports present must be used, which allows an application of this fluidic chip such that, with the actuator rotating counterclockwise, the collective flow rate may be selected by connecting any number of outer ports to supply tubing while blocking or recirculating the unused ports.

FIGS. 4A-4G show a multi-port valve according to certain embodiments of the invention. Specifically, the multi-port valve 400 is built upon the architecture of the rotary planar valve assembly 300 in FIG. 3C, except with a vastly higher port density. The multi-port valve 400 increases the number of ports by having the tubing port directly beneath each valve actuator, as shown in FIGS. 4A and 4B, where a through-chip fluidic valve unit 400 has a tubing 450 with a bore 451 seated in the tubing port of a circular through-plate fluidic chip 401 with multiple protrusions 421 inserted into fluidic support plate 414. In the open state as shown in FIG. 4A, the ball 403 is seated in the recess 430 in the actuator 402, and the access channel 419 in the fluidic chip is open and connected to tubing bore 451. As shown in FIG. 4B, the actuator 402 is rotated to the left so that the ball 403 is lifted out of the recess 430 to compress, collapse, and seal the access channel 421, switching it to the closed state. The resistance to shear force between the tubing 450 and the protrusion 421, and the insertion of the protrusion 421 into the support plate 414 together support the compressive force delivered by the ball 403 to create a compression zone and seal 460 immediately beneath the tubing port.

FIG. 4C shows a multi-port valve according to one embodiment, where the fluidic chip 401 has 100 valve units 400 with the protrusions 421 all penetrating corresponding holes in the support plate 414. As shown in FIG. 4C, a central port (i.e., the first port) 480 is connected to a single common channel 420 that is everywhere located outside of the compression zone 460 in FIG. 4B that supplies (or collects) media from each of the valve units (i.e., the second ports), such that the first port 480 is interconnected with all of the second ports. The design does not require any cross-overs of the fluidic channels, so all fluidic channels are in a single layer. FIG. 4D shows an enlarged view of the relation between the access channels 419 and the common channel 420, where the length of each access channel 420 is kept as short as possible to extend beyond the compression zone 460 in FIG. 4B to minimize the dead volume and fluid retention associated with the uncompressed portion of each sealed channel. FIG. 4D also shows a radial actuator recess groove 430 that can span the radial distance occupied by the four-deep pattern of valve units 400 that are angled to allow the radial actuator groove 430 to access one valve unit at a time, depending on the angle to which the actuator is rotated. In other embodiments, the valve in FIG. 4D with M ports could be divided into N identical sections, each with separate input ports 480 and common channels 420, and an actuator 402 with N recesses, to create an M×N multiple-port/multiple-throw valve.

FIGS. 4E-4G show the valve unit according to different embodiments, where the fluid is conveyed to the valve region not vertically by a tube 450 (see FIG. 4A) but horizontally by a channel 418 that is connected to a vertical via 427 that is in turn connected to access channel 419. In each of FIGS. 4E-4G, the left panels show the open state similar to FIG. 4A, and the right panels show the closed state similar to FIG. 4B. As shown in FIG. 4E, the upper fluidic layer 490 with the channel 418 is either rigid or elastomeric, the middle via layer 491 is rigid and supports the compressive force, and the lower layer 492 with channel 419 is elastomeric. The valve in FIG. 4F has only two fluidic layers 494 and 495 backed by a rigid support plate 493, and does not have a via layer and hence cannot provide fluidic cross-overs because the vias are created by any intersections of channels on opposing surfaces of the two layers 494 and 495. As shown in FIG. 4G, a rigid support layer 496 supports the compressive force delivered to the rigid or elastomeric upper layer 497 without channels, a via layer 498 with a channel to the right, and a lower elastomeric layer 499 with a channel to the left, thus supporting fluidic cross-overs because the channels are in the upper surfaces of elastomeric layers 498 and 499, and the middle layer 498 also provides the vias. In each embodiment, all layers may be bonded to prevent leaks. The high density of ball actuators in FIGS. 4C-4D can also be used to create a pump, since the use of three balls on a single straight channel operated in a specific sequence creates a pump. In certain embodiments, it is possible to create a rotating pump actuator that can provide this sequence with a properly curved groove.

Figure 5C:
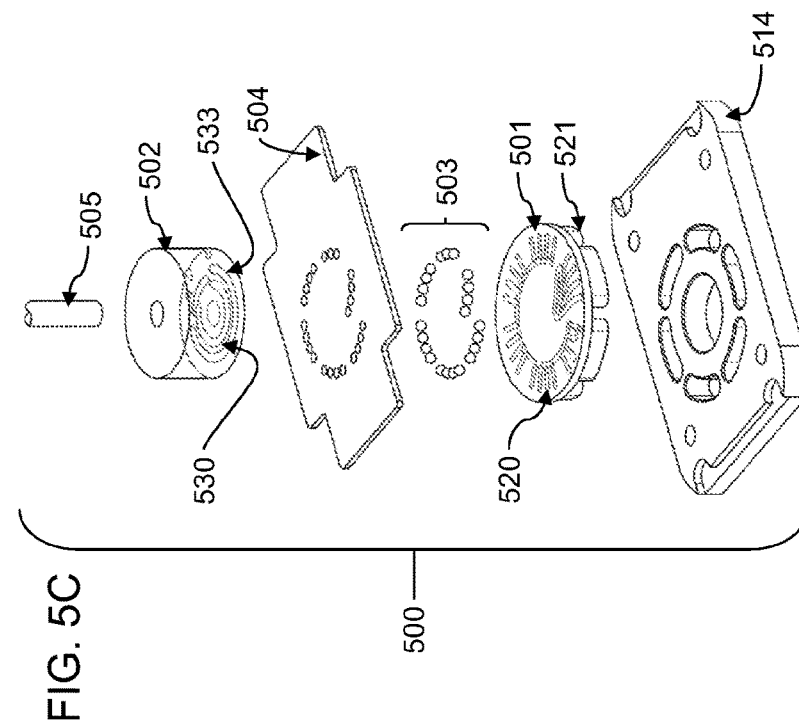
FIGS. 5A-5G show schematically a multi-port, multi-throw analytical valve, according to certain embodiments of the invention.
Figure 5A:
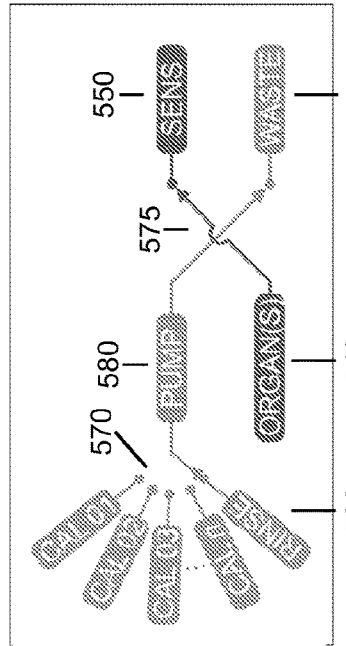
Figure 5B:
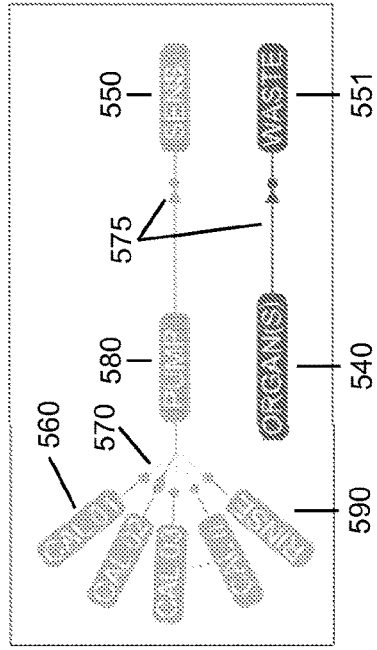

Given the need to remove media from a single bioreactor and deliver it to a sensor for analysis, and also sequentially deliver one or more calibration solutions to the sensor, a multi-port, multi-throw analytical valve, as shown in FIGS. 5A-5G, is disclosed according to certain embodiments of that invention. Specifically, FIGS. 5A and 5B show the operation and utility of the multi-port, multi-throw analytical valve to control the connection of the output flow of one or more perfused microbioreactors or organs 540 to a metabolic or other sensor 550 or a waste reservoir 551. During the operation of the analytical valve in either a measurement mode (FIG. 5A) or a calibration mode (FIG. 5B), the output flow of the bioreactor(s) is never blocked. As shown in FIG. 5A, in the measurement mode, the output of the organ(s) 540 passes through the sensor 550 by the position of the valve 575, and the common fluidic channels of the valve 570 and the pump 580 are rinsed by having the pump 580 withdraw rinse media from reservoir 590 and direct it towards the waste reservoir 551. Other calibration solutions 570 can be pumped to the waste reservoir 551 as well, depending upon the position of valve 570. Further, as shown in FIG. 5B, in order to calibrate the metabolic sensor 550, which is prone to drift, the valve 575 is switched to the calibration mode and valve 570 is used to select calibration media (CAL 02 shown) from one of several calibration media reservoirs 560 to perform the calibration operation, the calibration media is delivered to the sensor 550 by the pump 580, and the output(s) of the organ(s) 540 is directed towards the waste 551 by the action of the valve 575. In this design, the organ(s) may be perfused by gravity, pneumatic pressure, or a pump (not shown) such that the organ is always continuously perfused.

Figures 5D, 5E, 5F, 5G:
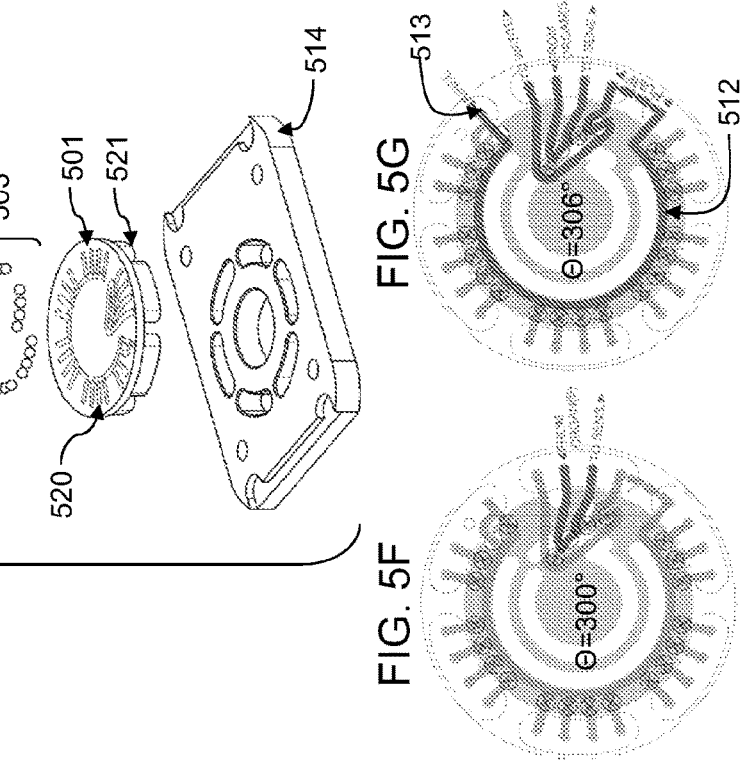

FIG. 5C shows a single microfluidic analytical valve 500 that can implement the various modes described in FIGS. 5A and 5B with a single actuator and motor. As shown in FIG. 5C, the analytical valve 500 includes a fluidic chip 501 with protrusions 521 that serve as tubing ports and anchor the fluidic chip 501 to the support plate 514, and microfluidic channels in the fluidic network 520 are sealed within the fluidic chip 501. The actuator 502, with ball-actuating grooves 530 in an actuating surface 533, is driven by a motor shaft 505, and includes actuating elements 503, a ball cage 504, and an off-board pump (not shown). The actuator 502 rotates to change the state of the valve and the caged actuating elements (in this embodiment balls) slide against the actuator. For example, in a first state as shown in FIG. 5D (where an actuator angle θ=0°), the analytical valve 500 collects an analyte from the bioreactor (not shown) through a bioreactor input channel, and sends it to a waste reservoir (not shown) through a waste output channel, while also collecting a rinse solution and directing it first through an internal fluidic channel 510, the off-board pump (not shown), through another internal fluidic channel 511, and finally to the sensor (not shown) through a sensor output channel. In a second state as shown in FIG. 5E (where the actuator angle θ=120°), a calibration solution is selected (e.g., CAL 08) through a corresponding calibration input channel and directed to the sensor through the sensor output channel, while the bioreactor input channel is interconnected to the waste output channel to send the analyte from the bioreactor to waste. In a third state (where the actuator angle θ=252-285°, not shown), the analyte remains directed from the bioreactor to waste, while all other conduits are closed and idle. In a fourth state as shown in FIG. 5F (where the actuator angle θ=300°), the bioreactor input channel is switched and interconnected to the sensor output channel to direct the analyte from the bioreactor to the sensor, while all other conduits are idle. In a fifth state as shown in FIG. 5G (where the actuator angle θ=306°), a rinse solution is directed through a rinse input channel to pass the length of channels 512 and 513 and sent to waste, while the analyte remains are collected from the bioreactor and sent to the sensor. In the embodiments as shown in FIGS. 5A-5G, the analytical valve 500 is designed such that fluid being pumped into the fluidic chip 501 from the bioreactor has an outlet at all times (either sent to the sensor, to waste, or to both), as not to cause a dead-end scenario that might rupture the fluidic chip 501 or interrupt perfusion of a sensitive organ chip. In certain embodiments, the number of ports or channels that can be serviced as shown in FIGS. 5C-5G is determined by the available circumference of the through-plate fluidic chip 501 and the underlying tubing-port protrusions 521 that anchor the fluidic chip 501 to the support plate 514, and the minimum spacing between individual channels in the fluidic network 520. As shown in FIG. 5C, a typical valve has 1 inlet/outlet port and 25 outlet/inlet ports, depending upon the chosen flow direction. In certain embodiments, different designs of the fluidic network 520 can use some of the 25 ports to service two or more independent bioreactors whose output is either sent to a sensor or waste.

The valves shown in FIGS. 3A-3C, 4A-4G and 5A-5G are serial access, i.e., the channels are opened and closed in sequence, so that if the valve has channel 4 open but instead it is necessary to open channel 6, with these valves the actuator must be turned until channel 4 is closed, followed by channel 5 being opened, then channel 5 closed, and finally channel 6 is opened. It is possible to use lagging-actuator (FIG. 3G) or other direct/random-access valve actuators to open any desired port in any order without opening other ports in the process.

Figure 6C:
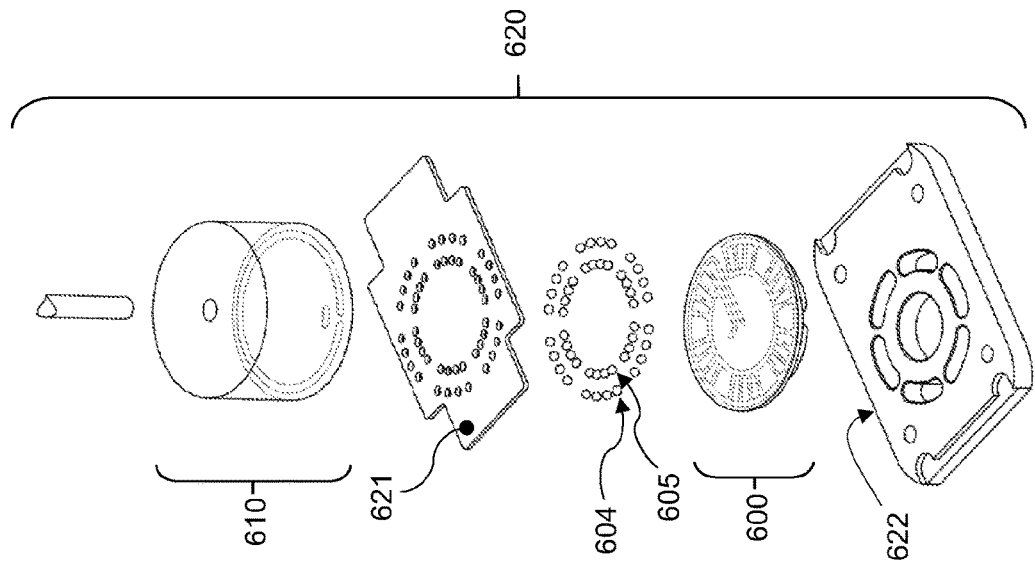
FIGS. 6A-6C show schematically a sensing valve, according to certain embodiments of the invention.
Figure 6A:
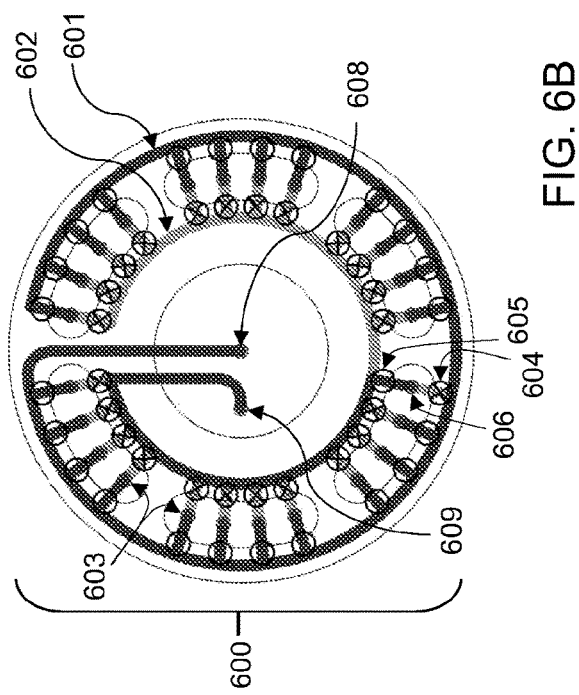
Figure 6B:
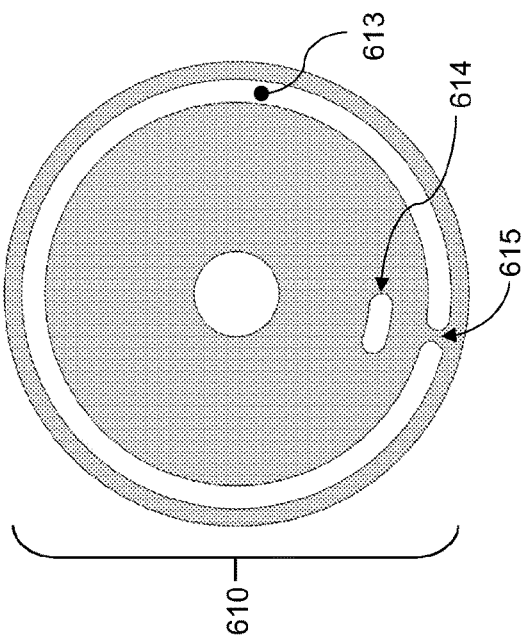

FIGS. 6A-6C provide details of a sensing valve assembly 620 according to embodiments of the invention, in which the fluidic chip 600 collects fluid from multiple (N≤24 as shown) inputs via ports such as 603 and 606, and directs either all of its inputs to a common output port 608, or all but a single selected input 606 to a common output 608, while fluid entering outlier port 606 is directed to an isolated "sensing" output 609, to which an analytical instrument is connected. As in other valve assemblies previously discussed, the face of the actuator 610 presses the plurality of actuating elements 604 and 605 into the underlying elastomeric polymer, thereby pinching the corresponding channel closed, except in the regions where the outer relief pocket 613 has all outer actuating elements 604 relaxed, and where the inner actuating relief 614 has the inner actuators 605 relaxed. When the gap 615 in the outer relief pocket 613 aligns with an outer actuating element 604, that element closes the connection of the port at that location to the outer fluidic bus 601 and hence a common output port 608, while the inner relief 614 at that angle allows that inner actuating element 605 to relax, thereby connecting the port at that angle to the inner fluidic bus 602 and hence a sensing port 609. Hence rotation of the actuator 610 selects which port is connected the sensing port 609, and ensures that all of the other ports are connected to the common output port 608.

The bioreactor media line that is to be analyzed is selected by rotating the actuator 610 to a position in which the actuating elements 604 and 605 corresponding to the selected target port 606 are switched such that the selected target port 606 becomes isolated from the common output 608 and opened to the sensing output 609, as exemplified in FIG. 6A. Meanwhile, all the other ports 603 remain connected to the common output port 608 and isolated from the sensing port 609. As shown in FIG. 6C, the actuating elements 604 and 605 are constrained by a cage 621, and the fluidic chip 600 is constrained by a baseplate 622.

Figure 7C:
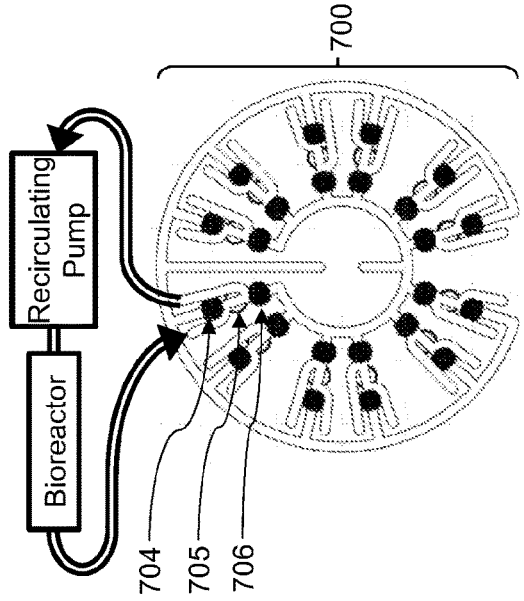
FIGS. 7A-7D show schematically a cut-in valve, according to certain embodiments of the invention.
Figure 7D:
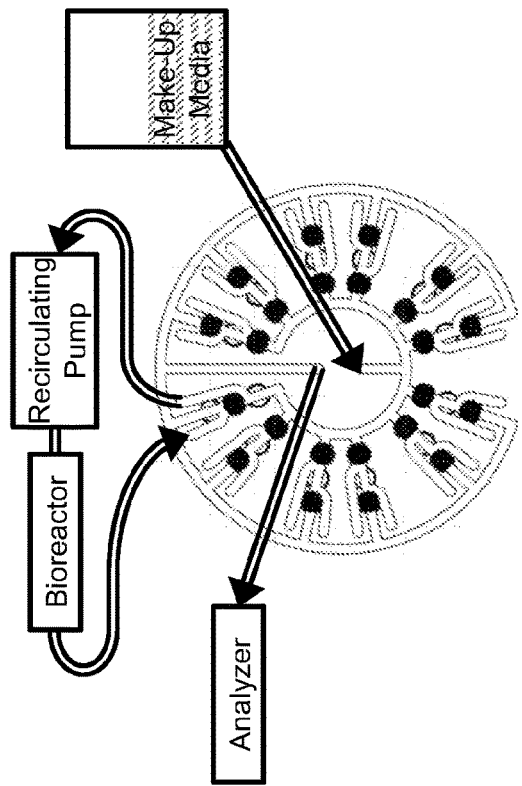
Figure 7A:
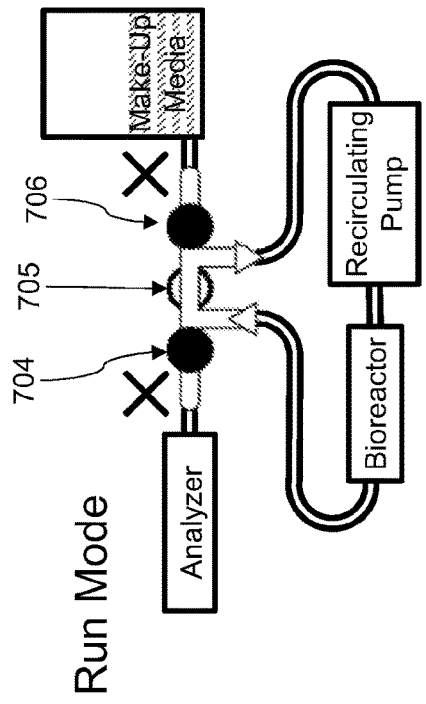
Figure 7B:
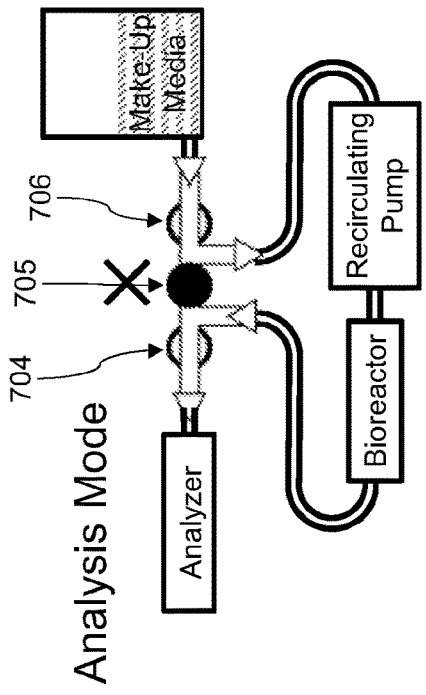

FIGS. 7A and 7B explain the concept of the "cut-in" or "insert" valve that supports a run mode in which a bioreactor is connected to a recirculating pump, and an analysis mode in which make-up media is pumped into the bioreactor, displacing media that is delivered to an analyzer. For each module of the valve, there are four connections and three actuating elements. In the run mode, the actuating element 705 is relaxed so that the recirculating pump can push media through the bioreactor, concurrently, the actuating elements 704 and 706 compress the channels, thereby isolating the module from both the analyzer and the media supply, as shown in FIG. 7A. In the analysis mode, the actuating element 705 is in compression and the actuating elements 704 and 706 are relaxed, thereby allowing the make-up media to be drawn from its reservoir and the bioreactor media delivered to the analyzer, as shown in FIG. 7B.

FIGS. 7C and 7D show the through-plate fluidic channel layout 700 along with the actuating elements 704-706 that accomplishes these modes for a total of 12 bioreactors. A rotation of the actuator by the appropriate angle allows the sequential sampling of each bioreactor. The topology is serial access, and the valve has a low dead volume in each fluidic module loop. The dead volume is in the analytical loop, and the clearing of that dead volume is limited by the amount of fresh media that can be added to sweep the analytical loop. In other embodiments, an extra input port uses fresh media to flush the channels.

Various exemplary embodiments of a fluidic system that utilize the above disclosed valves and pumps in series-parallel fluidic processing for multiple well-plate wells, organoid-, organ-, and tissue-chips, and other perfused bio-objects are described as follows.

Parallel Perfused Biomodules

The parallel perfusion of a plurality of identical bioreactors or other bio-objects presents a number of technical challenges. The classic physiological proportion problem when modeling functional tissues is important here: volumes of each of the organ compartments must be closely matched to actual physiology in order to recapitulate functional tissues that can model both health and disease. Similarly, when organ chips, bioreactors, or other bio-objects are perfused in parallel to create replicates, it is critical that the flow parameters be as close as possible to being identical.

Figure 8A:
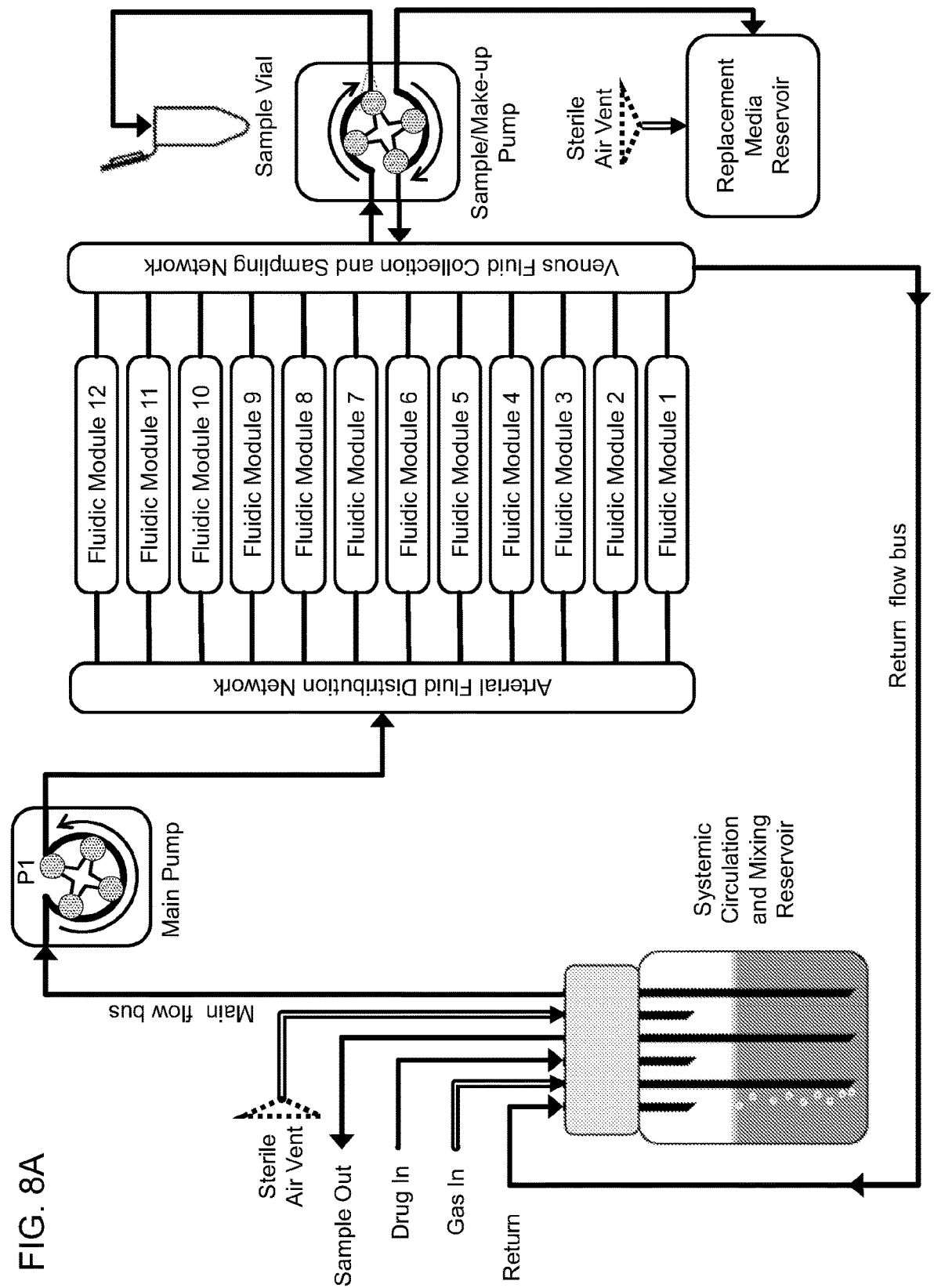
FIGS. 8A-8E show schematically a fluidic system for a parallel, multi-organ chip perfusion scheme, according to certain embodiments of the invention.

As shown in FIG. 8A, the simplest approach to perfusing multiple organs in parallel involves placing balanced fluidic distribution networks, i.e., splitters, upstream and downstream of the bioreactors, but in practice it is difficult to maintain a balanced flow between reactors unless a very high fluidic impedance is inserted in each branch of the splitter, which then requires high perfusion pressure and high shear forces in the constrictions. This configuration does not specifically detail the possibility of sampling from individual organ chips. A main pump P1 removes oxygenated media from a single systemic, circulating and mixing reservoir and delivers it to the upstream, arterial fluid distribution network. In this exemplary embodiment, twelve fluidic modules, Fluidic Module 1, Fluidic Module 2, . . . and Fluidic Module 12, are perfused in parallel. Each fluidic module can be wells in a well plate, organ- or organoid-chips, bioreactors, or other bio-objects. The effluent from the 12 fluidic modules is combined in the downstream venous fluid collection and sampling network. A common, mixed fluidic sample can be removed from the venous collection network using a sampling pump, which if implemented as a two-channel pump as shown in both FIG. 8A and FIG. 3J, can also provide make-up media to replace what was removed for sampling. Finally, the return flow delivers media back to the systemic circulation and mixing reservoir.

Figure 8B:
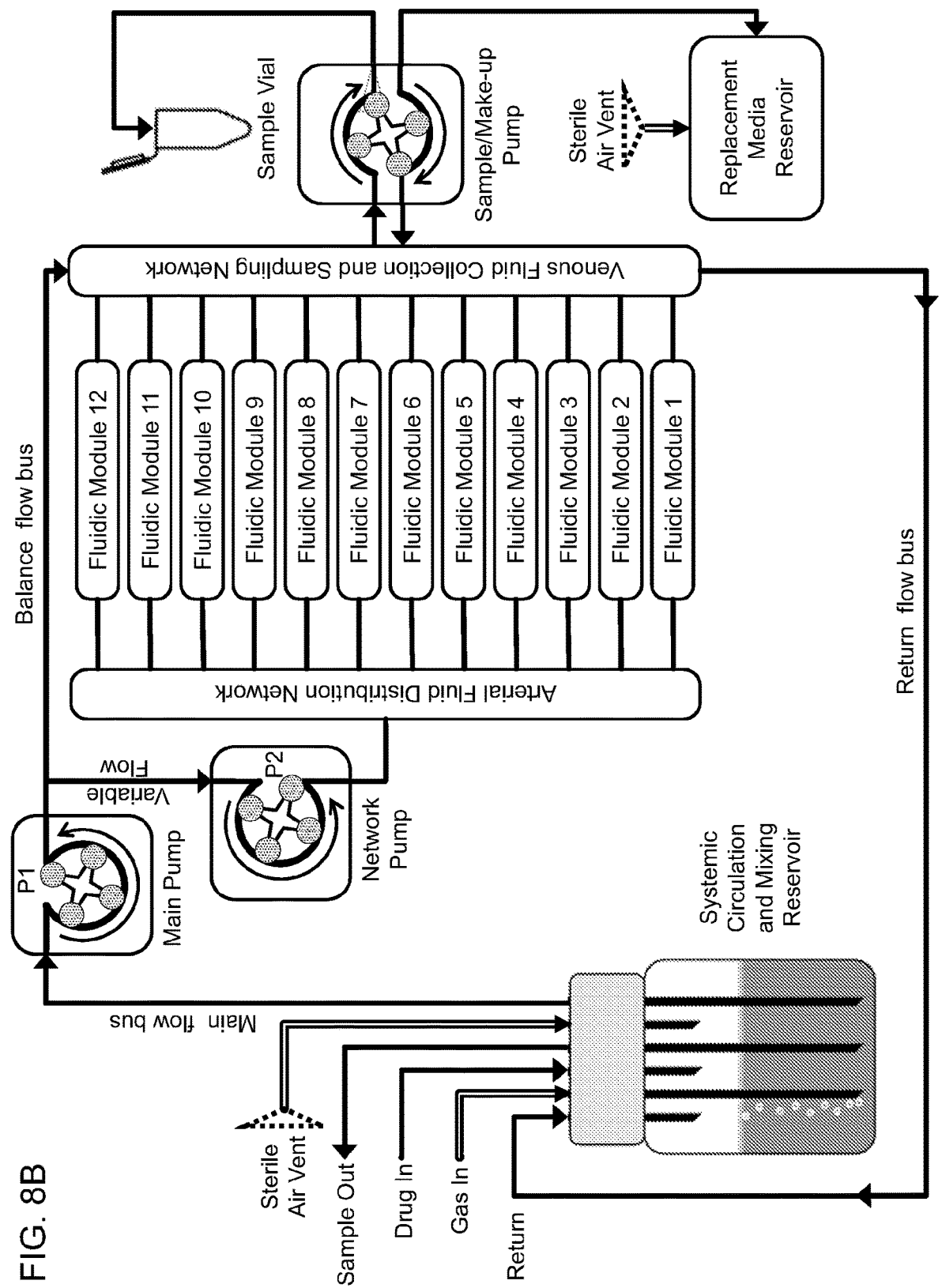

Often, it is desirable to alter the flow rate of media through the fluidic modules. If there are other sets of fluidic modules being perfused by the main pump, reducing the flow rate of the single, main pump P1 would alter the flow in the entire circuit, and can as well affect the oxygenation and sampling properties. As shown in FIG. 8B, the addition of an extra circulating or balance line and a network pump P2 dedicated to the plurality of fluidic modules shown allows higher flow rates through the media reservoir and better oxygenation, and also allows independent adjustment of the flow through the set of organs shown, while leaving the flow unchanged elsewhere in the circuit and possibly with other organs (not shown).

Figure 8C:
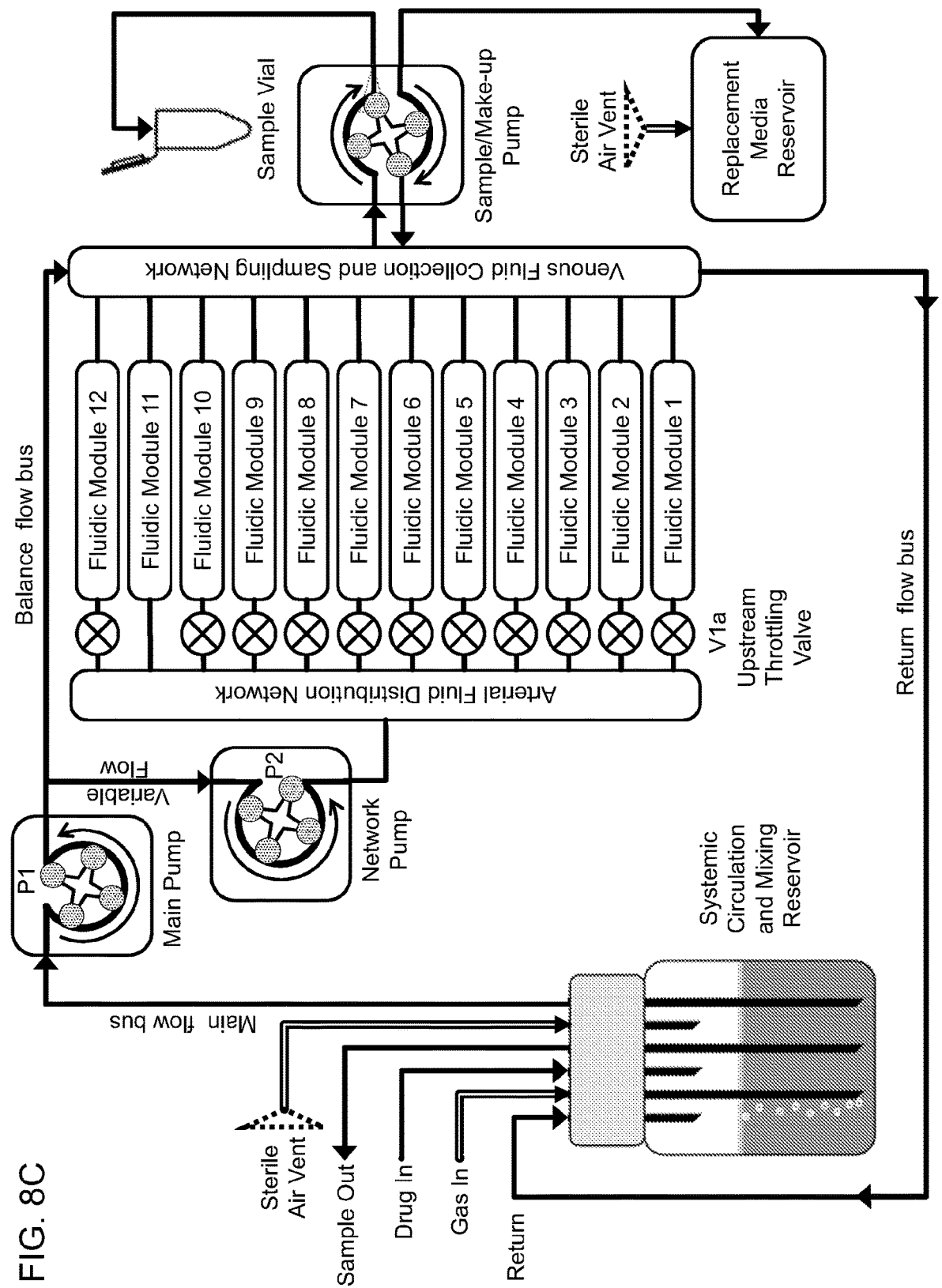

In the case where it is desirable to have a different flow through different fluidic modules, the upstream throttling valve (V1a) shown in FIG. 8C serves as a ganged metering valve upstream of each organ. This valve can also be a mixing valve or another valve type that provides additional local fluid control functions. As shown, Fluidic Module 11 receives full flow, while the others receive no flow. Periodic opening and closing of various ports in V1a can be used to recapitulate the effects of the cycling of precapillary sphincters in a perfused tissue bed.

Figure 8D:
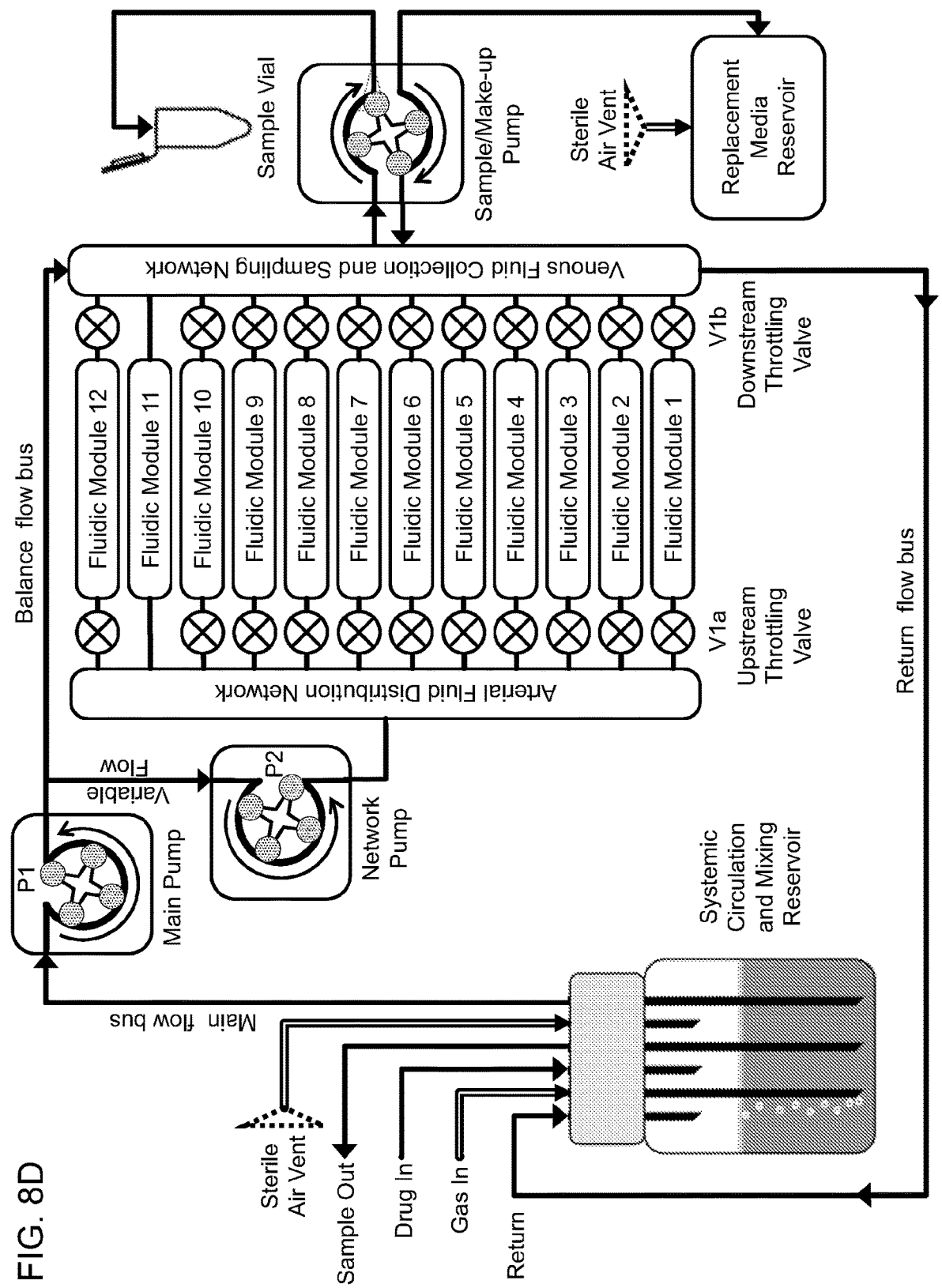

One limitation of having fluidic modules regulated only by an upstream valve is that were an upstream valve closed, the fluidic module would still be pressurized by the fluid pressure in the downstream network. Valves on both the upstream and downstream sides of each fluidic module as shown in FIG. 8D can completely isolate subsets of modules, including ones in which the cells were not loaded or were not thriving. If the valves are continuously adjustable, the flows and pressures in each chamber (fluidic module) can be separately regulated. Hence proper control of the ports in valves V1a and V1b makes it possible to have different flow rates through the various organs or bio-objects in the array.

Figure 8E:
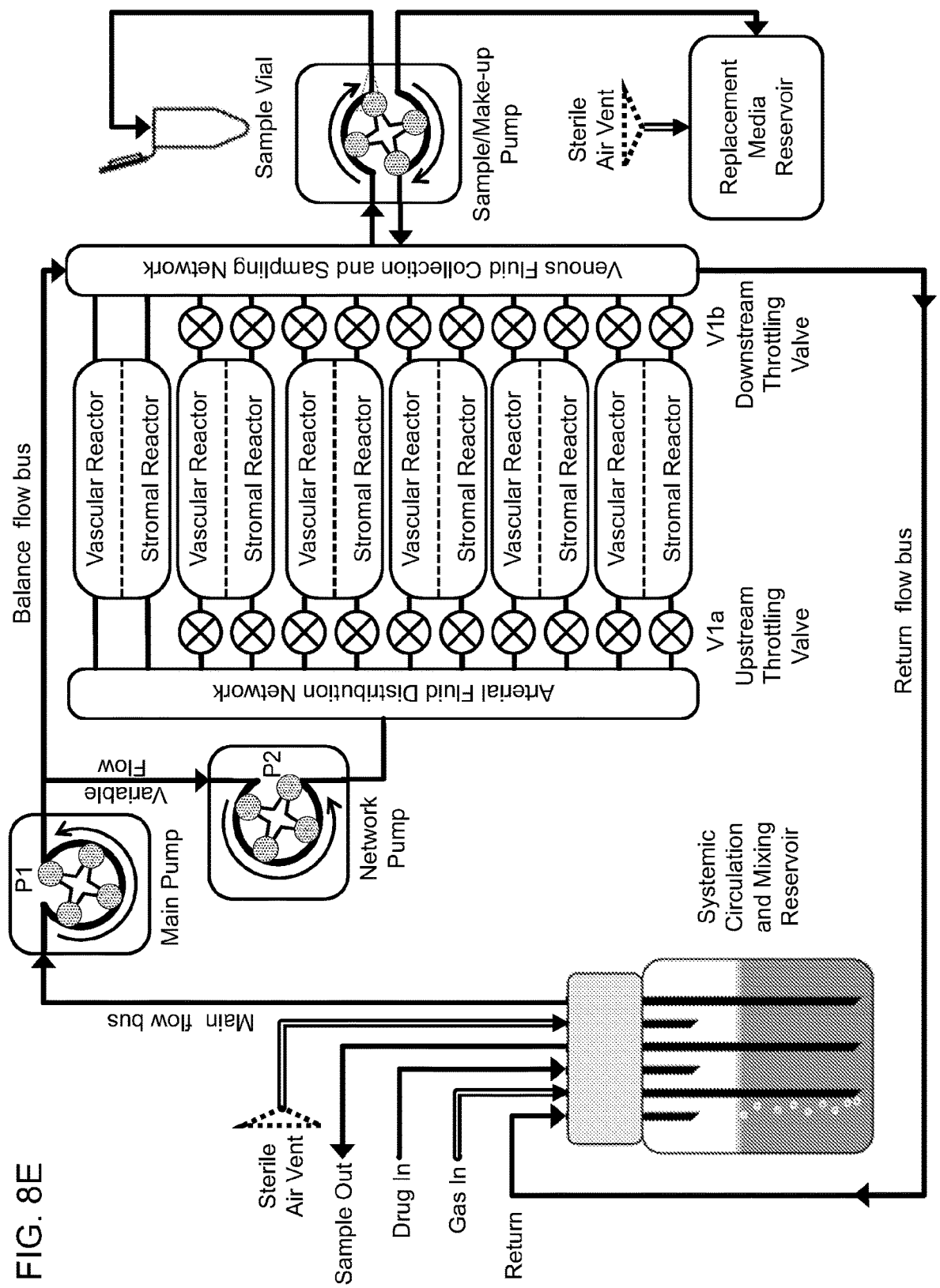

The twelve fluidic modules shown in FIGS. 8A-8D can in fact be the vascular and stromal or luminal and abluminal sides of six barrier bioreactors, as shown in FIG. 8E, where the two chambers are separated by a semipermeable membrane that can support endothelial and/or epithelial cells to recapitulate barrier function. As shown, both sides of the barrier reactors are serviced by the same supply and distribution networks, pumps, valves, and media. In practice, the plurality of vascular/luminal bioreactors would have one dedicated fluid circuit, while the stromal/abluminal bioreactors would have a second. The two circuits can be functionally equivalent to the one shown in FIG. 8E, except for media composition and possibly flowrates.

Figure 9A:
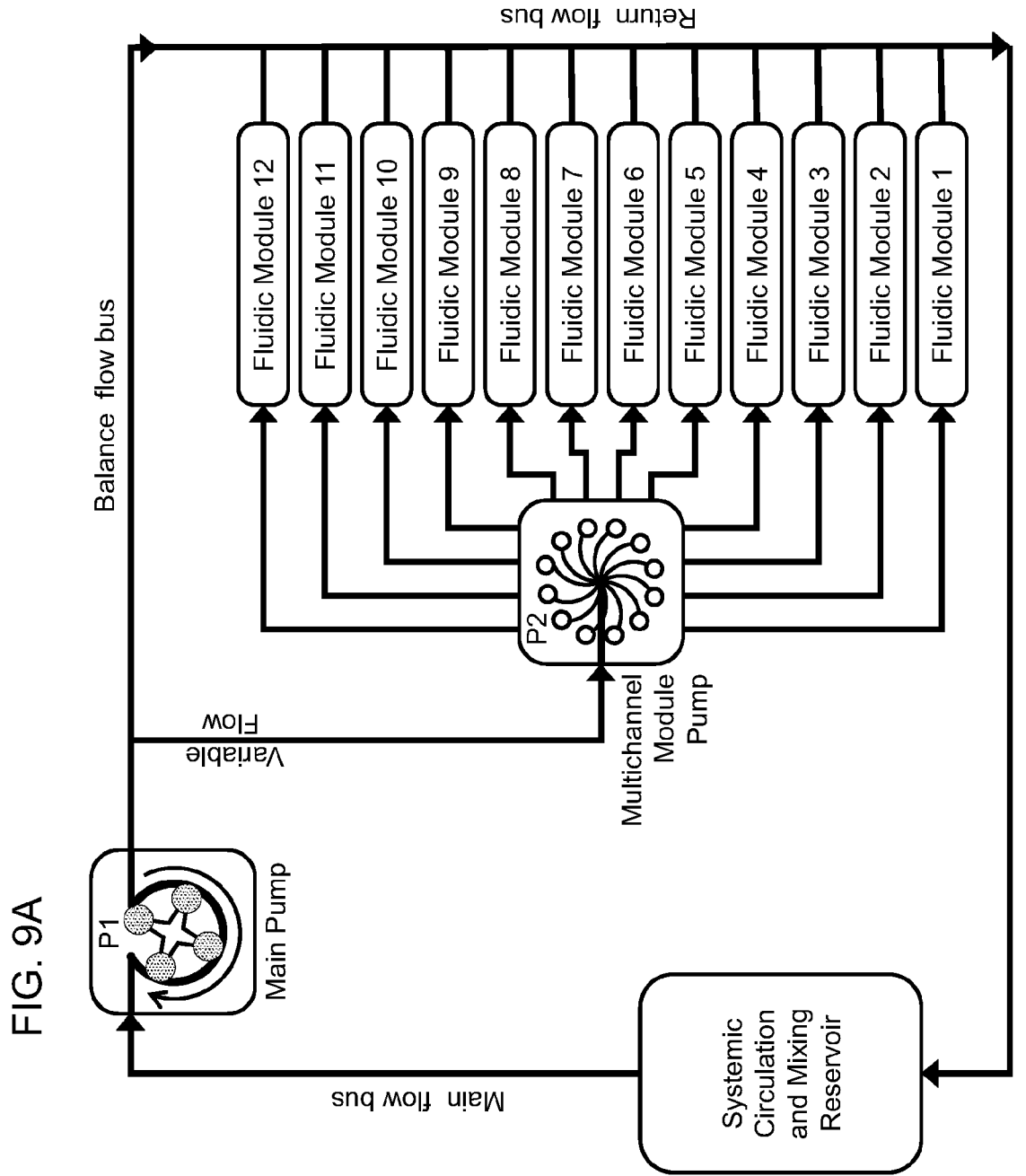
FIGS. 9A-9D show schematically a fluidic system for multi-organ perfusion with 12-channel pumps or valves, according to certain embodiments of the invention.

The multichannel pumps and valves described in FIGS. 3A-3Q through 7A-7D can be combined in a variety of serial and parallel configurations. For example, it is possible to use a multichannel pump, as shown in FIGS. 3N-3Q to provide identical perfusion flow rates for each fluidic module without the use of flow restricting splitter networks as described in FIGS. 8A-8E. In one embodiment shown in FIG. 9A, a multichannel module pump perfuses each module. In contrast to a selector-valve perfusion scheme, with a multichannel pump all devices get perfused with a 100% duty cycle. Pumps can be designed to provide different flow rates to each fluidic module but they would always be the same fraction of the flow. Using a multichannel pump reduces the number of motors needed to operate the perfusion system as compared to using a valve.

Figure 9B:
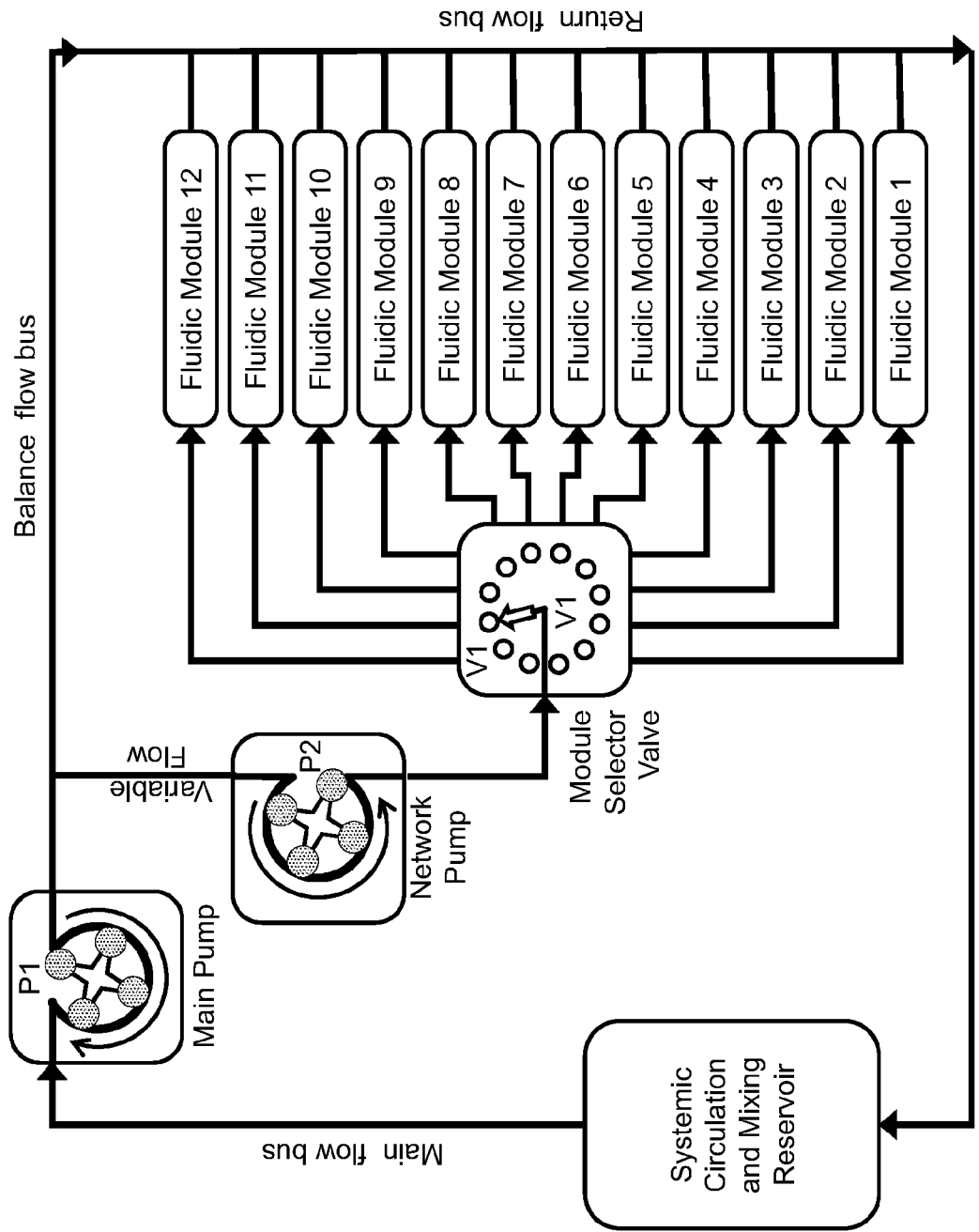
Figure 9C:
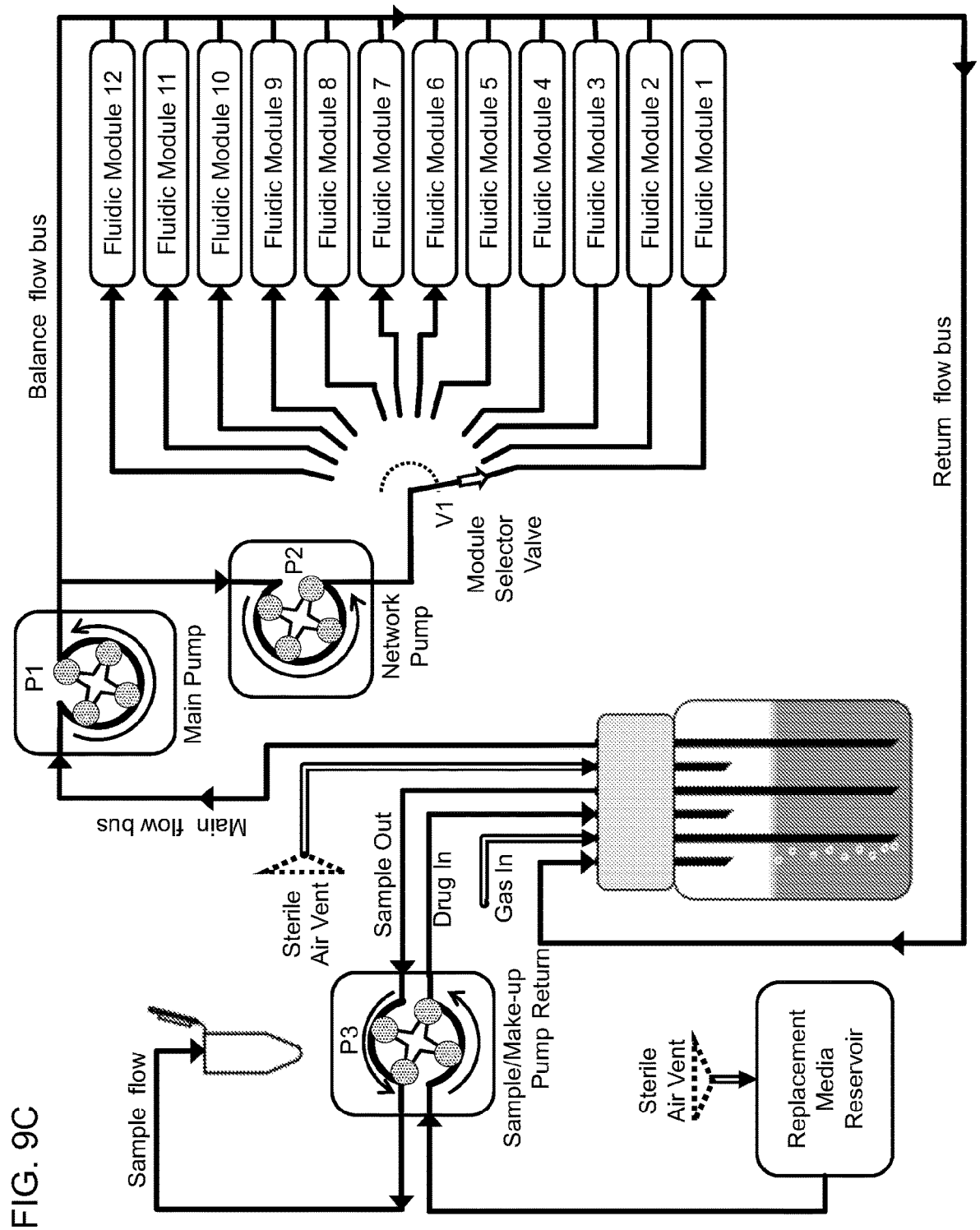

FIGS. 9B and 9C use a rotary module selector valve, V1, as shown in FIG. 3A-3D, to select which module will be perfused by the network pump P2. FIG. 9C includes a sampling/make-up pump, replacement media reservoir and sterile air vent as shown in FIGS. 8A-8E.

Figure 9D:
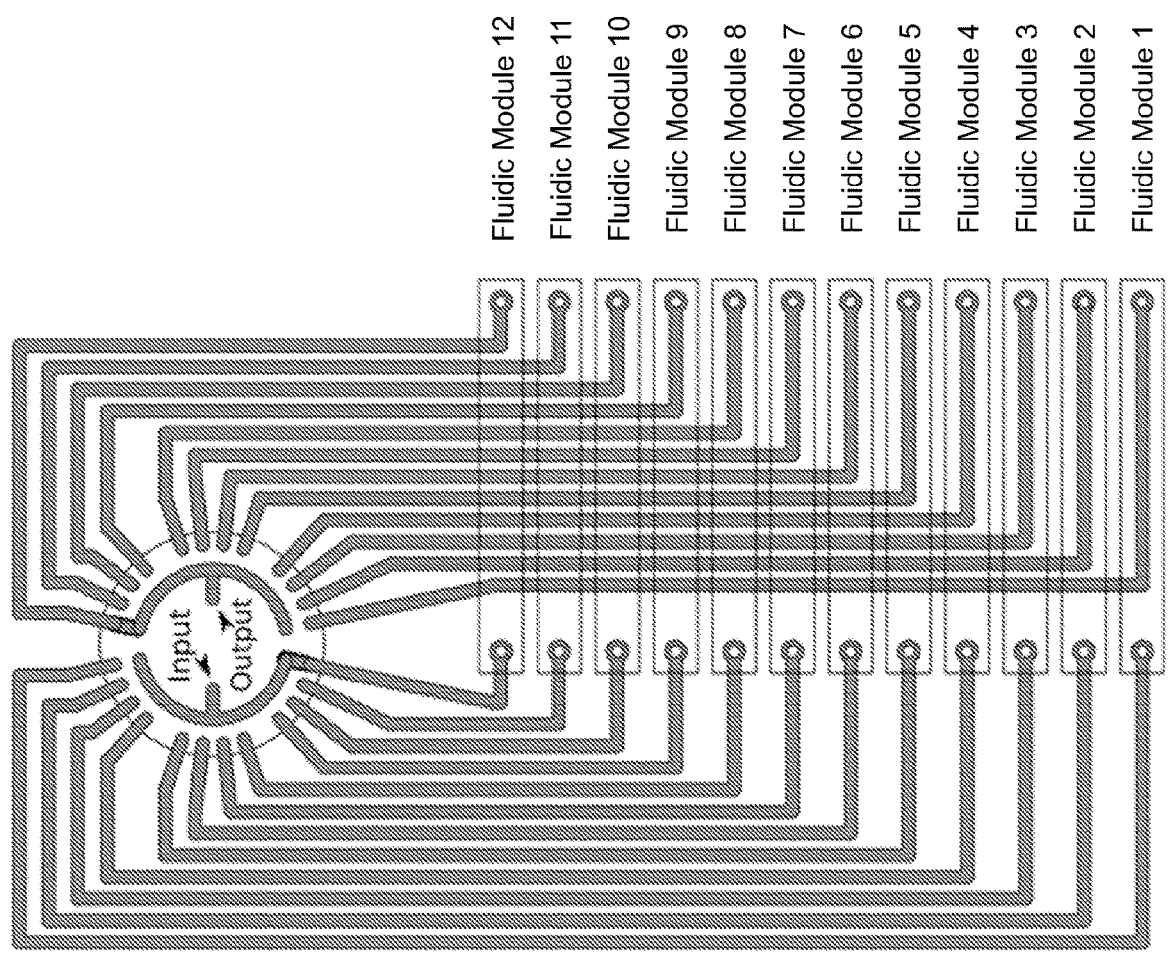

If it is desired to have both upstream and downstream selector valves, as shown schematically in FIGS. 8D-8E, it is possible to utilize the 2×12 valve shown in FIG. 9D to connect a single input port and a single output port to any one of the twelve fluidic modules. As drawn, the modules can be accessed in sequence, however a lag-lead valve actuator can be used to provide random access to any of the fluidic modules. As a result, the configuration shown in FIGS. 8D-8E can be fully automated with a single, rotary planar valve. Using a valve gives a high level of control over the total flow volume seen by any organ chip but requires that each chip get perfused only a fraction of the time. In the case of 12 organ chips, equal perfusion means 8.3% duty cycle for each organ. This perfusion scheme can allow some back pressure from the systemic circulation bypass path to pressurize organ chips that are not actively perfused by the selector valve (FIG. 8E), and it may be desirable to valve the outputs as can be done with the valve shown in FIG. 9D. The organ selector valve in FIG. 9D can support time-division multiplexing through the array, with different average flow rates if desired. Depending upon the rate at which the 2×12 valve is switched, this can also be used to produce physiologically realistic intermittent flow in capillary beds, either due to pulse pressure or arteriole cycling.

Figure 10A:
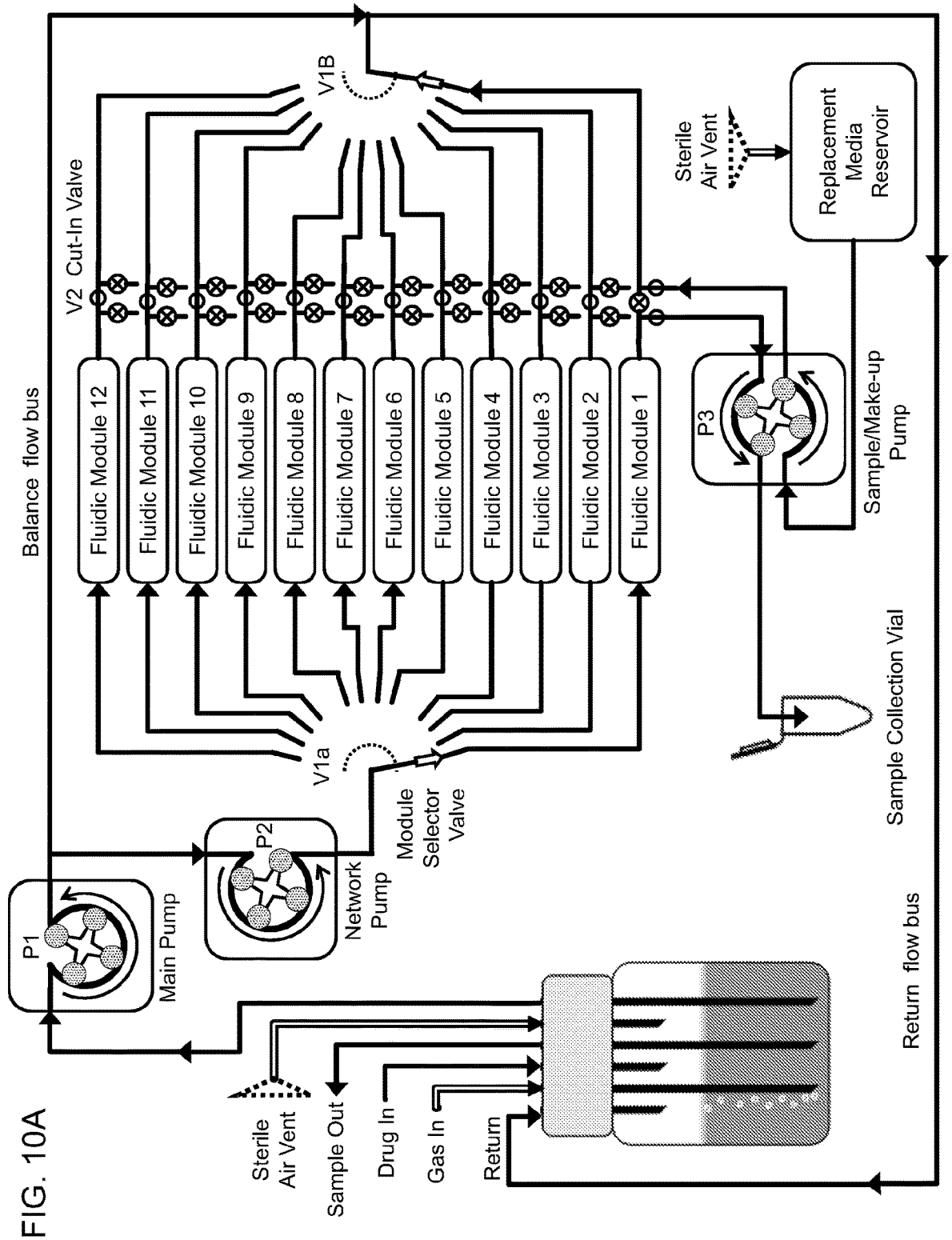
FIGS. 10A-10C show schematically a fluidic system for multi-organ perfusion with individual organ sampling, according to certain embodiments of the invention.

The pumps and valves in the embodiments described so far only allow sampling at a common collection network or reservoir. It can be important to selectively sample the output of a single fluidic module, which can be done by applying the multichannel cut-in valve of FIGS. 7A-7D in addition to the 2× 12 module selector valve V1a, as shown in FIG. 10A. In this case, the cut-in valve V2 can be used to select which fluidic module output is being sampled while all of the other fluid flows are unperturbed. Because media is being removed for analysis, as discussed above, the sample/make-up pump P3 can be used to deliver replacement media downstream of the selected module, e.g., Fluidic Module 1 in FIG. 10A.

Figure 10B:
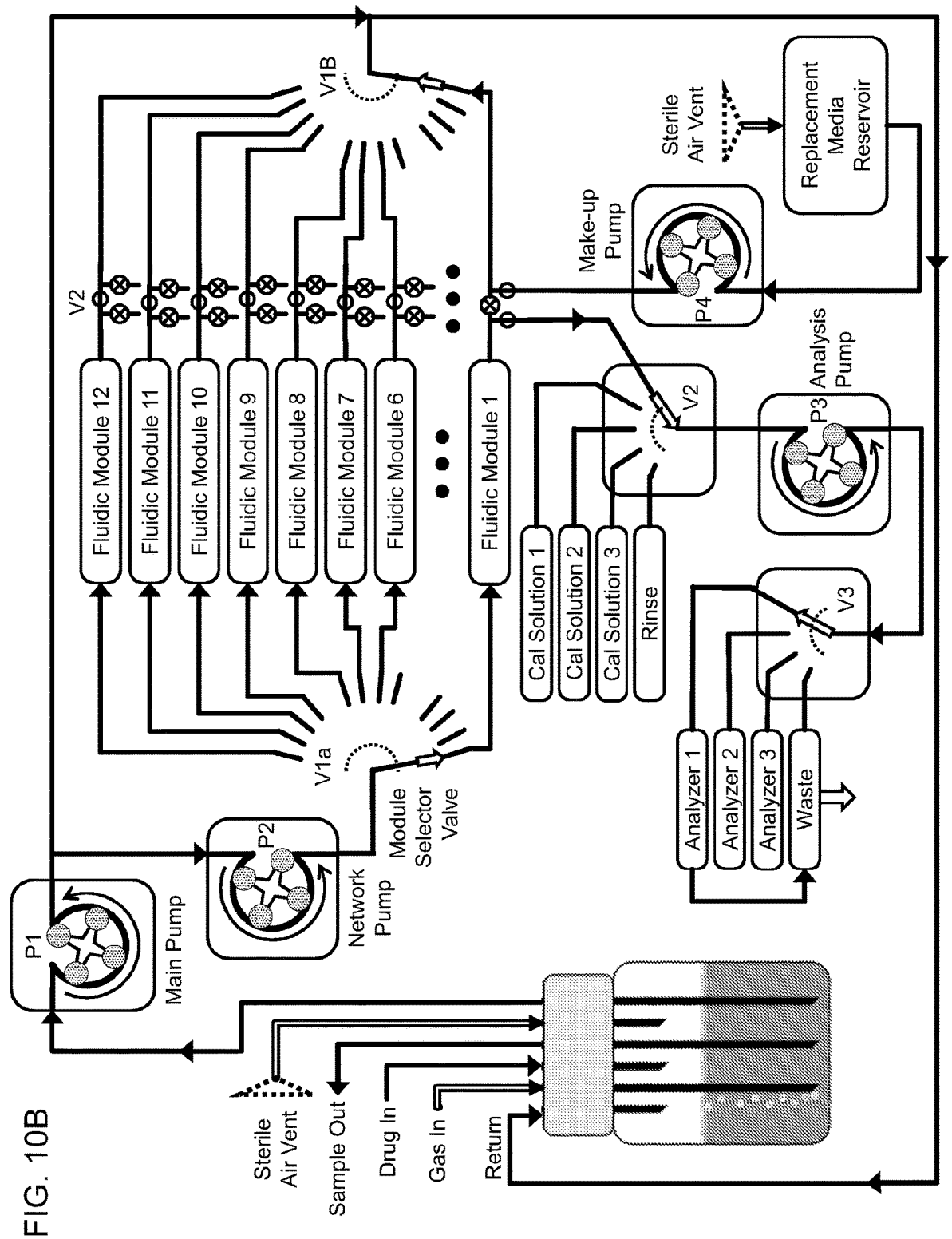

The embodiment shown in FIG. 10B is similar to FIG. 10A, with the exception that valves V2 and V3 and analysis pump P3 are used to send media aliquots to one or more analyzers. In practice, this can be readily implemented using the analytical valve shown in FIGS. 5A-5G. As shown, the fluidic modules would be sequenced sequentially, but the use of a lagging actuator (FIG. 3G) can allow a fluidic module to be sampled randomly.

So far, we have shown the cut-in valve being used as a means to remove individual samples from each of a plurality of bio-object perfusion lines for analysis by a one or more analytical instruments. It is possible to operate the cut-in valve in the opposite direction, wherein the plurality of bio-object perfusion lines is connected by the cut-in valve to a microformulator or other media-modifying fluidic module. In this case, a custom-formulated bolus of reagents, drugs, or toxins can be injected sequentially into each of the bio-object perfusion lines. Similarly, any one or more of the fluidic modules shown in FIGS. 8A-8E through 10A-10C can be replaced by another type of fluidic device, e.g., an analyzer, a microformulator, a pump, a valve, or an in-line sensor. The embodiments presented do not limit the scope of the pump, valve, and sensor technologies that can be connected in series, parallel, or series-parallel configurations.

Figure 10C:
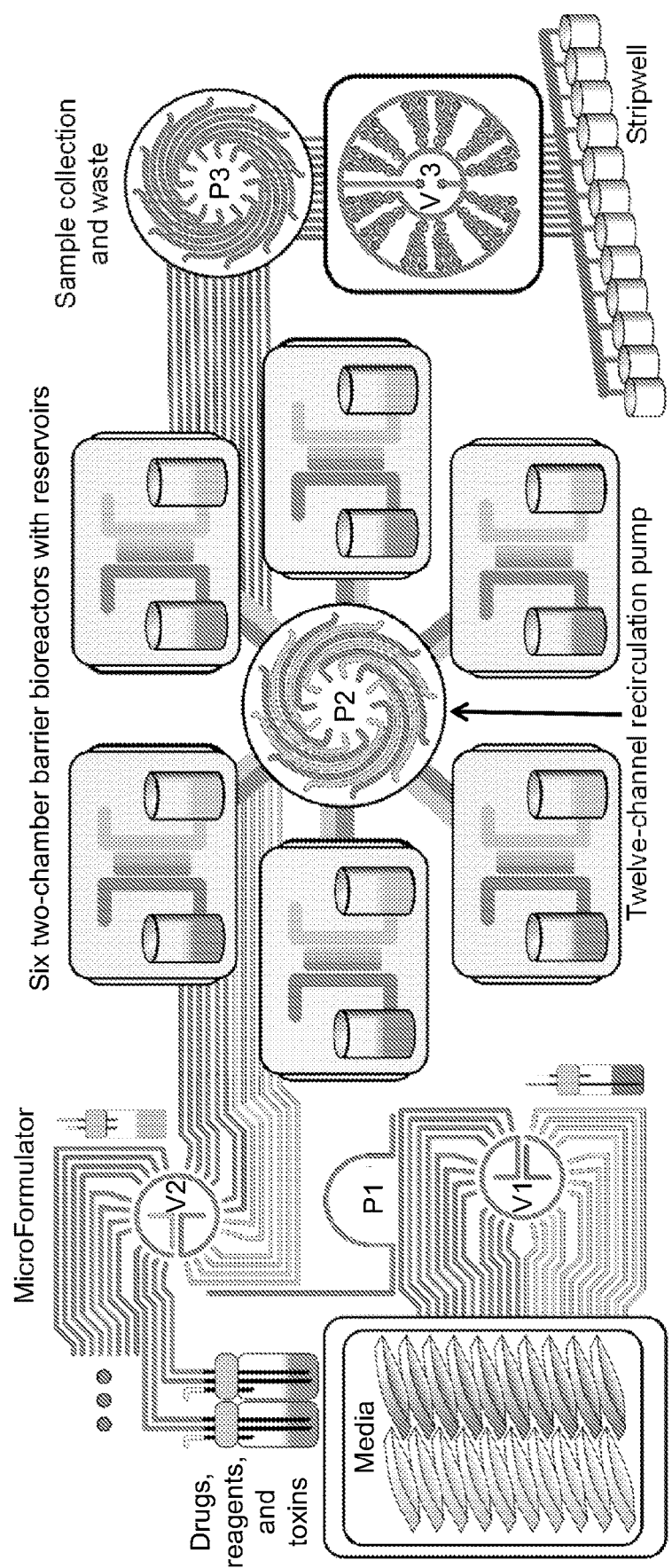

FIG. 10C presents a schematic representation of a more generalized, fully parallelized version of FIGS. 10A-10B. Valve V1, pump P1, and valve V2 form a microformulator. Media can be drawn from a set of thermally controlled reservoirs, and the microformulator can be used to mix solutions that are temporally stored in drug, reagent, and toxin vials for later delivery. Because each of the six two-chamber barrier bioreactors shown has both vascular/luminal and stromal/abluminal reservoirs, and because the recirculation pump P2, the sample and waste collection pump P3, and the cut-in valve V3 all have 12 independent channels, both sides of each of the six barrier bioreactors can operate independently of any of the other channels. As shown, there is no interconnection between any of these chambers, except when the microformulator is operated in reverse so that media can be drawn from one chamber, stored in either fluid line or vial, and then delivered to another chamber. In this manner, it would be possible to create a perfusion system capable of controlling the perfusion and interaction of numerous organ-on-chip, organoid, or other bio-object modules while allowing sampling from each module, controlling module-module communication, and maintaining overall functional fluid volumes.

Parallel Chemostats

With the growing recognition that continuous culture provides major scientific benefits over batch culture in well plates as discussed for FIGS. 1A-1D, there is a pressing need for parallel, small volume, automated perfusion bioreactor systems. The parallel and serial pump and valve technologies presented above enable a multitude of instrumented and precisely controlled mL-scale chemostats that can support massively parallel microbial experiments that can be connected directly to a high-speed untargeted mass spectrometry system for metabolomics and operated as self-driving laboratories that benefit from the power of machine learning. Both basic microbial science and commercial biomanufacturing will benefit from massively parallel experiments that can refine models of cellular signaling and metabolism, allowing researchers to explore connections that were previously beyond their grasp.

Figure 11:
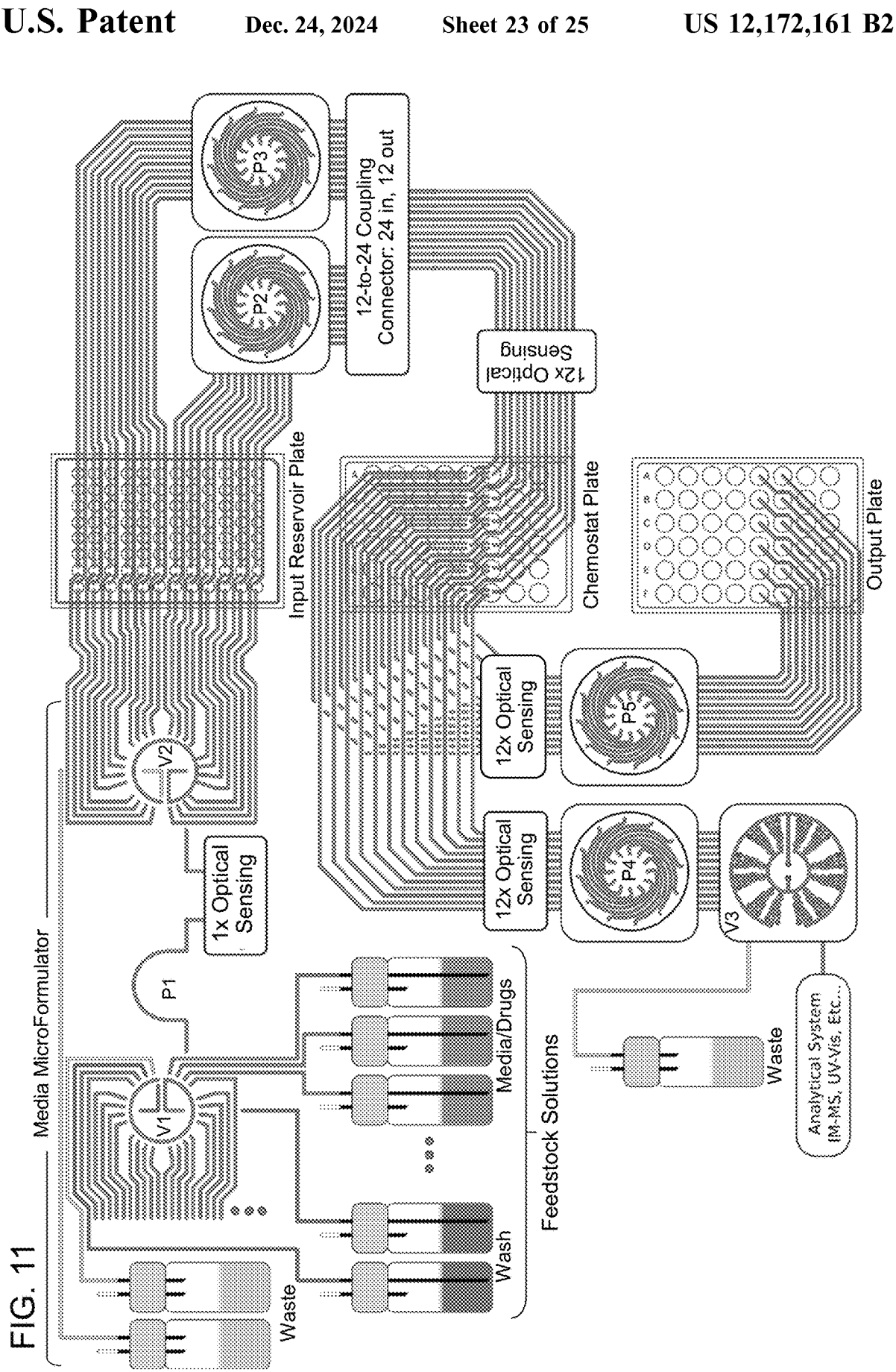
FIG. 11 shows schematically a fluidic system for parallel chemostats, according to certain embodiments of the invention.

One embodiment of this approach of using parallel and serial pump, valve, and sensor technologies to create a massively parallel chemostat system is shown in FIG. 11, which shows for illustration purposes a 12-channel implementation of what can be readily extended to a 48-channel system. The system has three stages: microformulation of media that is stored in an input media plate, a chemostat stage/plate that has pumps for continuous delivery of media to each chemostat, and an analysis module for real-time and end-of-experiment sampling, each of which has pumps, valves, and a dedicated well plate. In the embodiment shown in FIG. 11, the media microformulator that has a 25-port input selector valve (V1), a single-channel pump (P1), and a 25-port output director valve (V2) that together can create a different time-varying perfusion mixture for each chemostat. The input fluid to the microformulator is drawn from the 22 feedstock solutions selected by input selector valve V1. The microformulator output director valve V2 is used to deliver formulated media to two sets of 12 wells in the 96-well input reservoir plate. The two waste vials connected to V1 are used to rinse the common channel of V1 and V2 by appropriate selection and pumping of wash solutions.

In contrast to mammalian cells, for yeast and other microbes the growth rate is sufficiently fast and the cell cycle duration so short that time division multiplexing by the microformulator to directly perfuse 48 1 to 2 mL chemostats would not be sufficiently rapid to maintain either steady concentrations or the continuous flow required for proper operation of all of the chemostats. The use of two sets of wells in the input reservoir plate addresses this problem since one set of reservoir wells can be refilled while the second set is being delivered continuously by twelve-channel spiral pumps P2 or P3 to twelve populated wells in the 48-well chemostat plate, providing uninterrupted perfusion. The effluent (cells plus media) from each chemostat well is collected by a 12-channel pump P4 and delivered to the 12-port, multi-mode output/sampling valve V3. Depending upon whether the non-sampled flows are directed to a common waste or continue along separate fluidic paths will determine whether V3 is a sensing valve as shown in FIG. 6 or a cut-in valve as shown in FIG. 7, respectively. This valve will either deliver the effluent from each chemostat well to a separate well in the refrigerating/freezing output plate (not shown), or allow each effluent line, one at a time, to be diverted to an external analyzer, such as a rapid-cycling UPLC-IM-MS, SPE-IM-Q-ToF-MS, a Raman or UV-vis spectrometer, or optical or electrochemical metabolic sensors. As appropriate, the analyzer can be equipped with a spiral microfluidic sorter or a filter (alternating tangential flow (ATF) or tangential flow filtration (TFF) 34-37) for real-time separation of cells from media. The collected cells can examined with a fluorescence activated cell sorter (FACS), a CyTOF cell analyzer, or processed by an in-line microfluidic acoustic, chemical, or electrical lyser for cytosolic analyses. (Note that alternatively, a multichannel spiral microfluidic cell separator, an ATF, or an TTF could be used to return to the appropriate bioreactors all cells in the plurality of effluent streams leaving either P4 or P5 to allow the system to operate as a continuously perfused suspension bioreactor with cell capture and return.) In its third mode, the effluent from all chemostat wells will be diverted to waste to ensure continuous perfusion when no sample is needed or the output plate is removed after bulk sample collection. Using the multichannel pumps and valves shown, bidirectional washing of the microformulator, the input reservoirs, and even each well in the chemostat plate is possible. The chemostats can be inoculated by using an external pipettor or robot to seed either the chemostat plate, which can be removed, or a transfer plate that has one or more seeded wells and is then installed in place of the output plate with pump P4 run in reverse to deliver the selected cells into various chemostat wells to restart their culture. The single-channel optical sensing module is used to track an intentionally injected bubble for measurement of flow rate, or to identify when a reservoir has been emptied. The two 12-channel optical sensing modules measure $PO_2$, $PCO_2$, and pH and optical density (OD) of the media entering and leaving each chemostat. It would also be possible to implement multichannel optical or electrochemical sensors of other metabolic variables, including alcohol, lactate, and glucose, among others.

Figure 12:
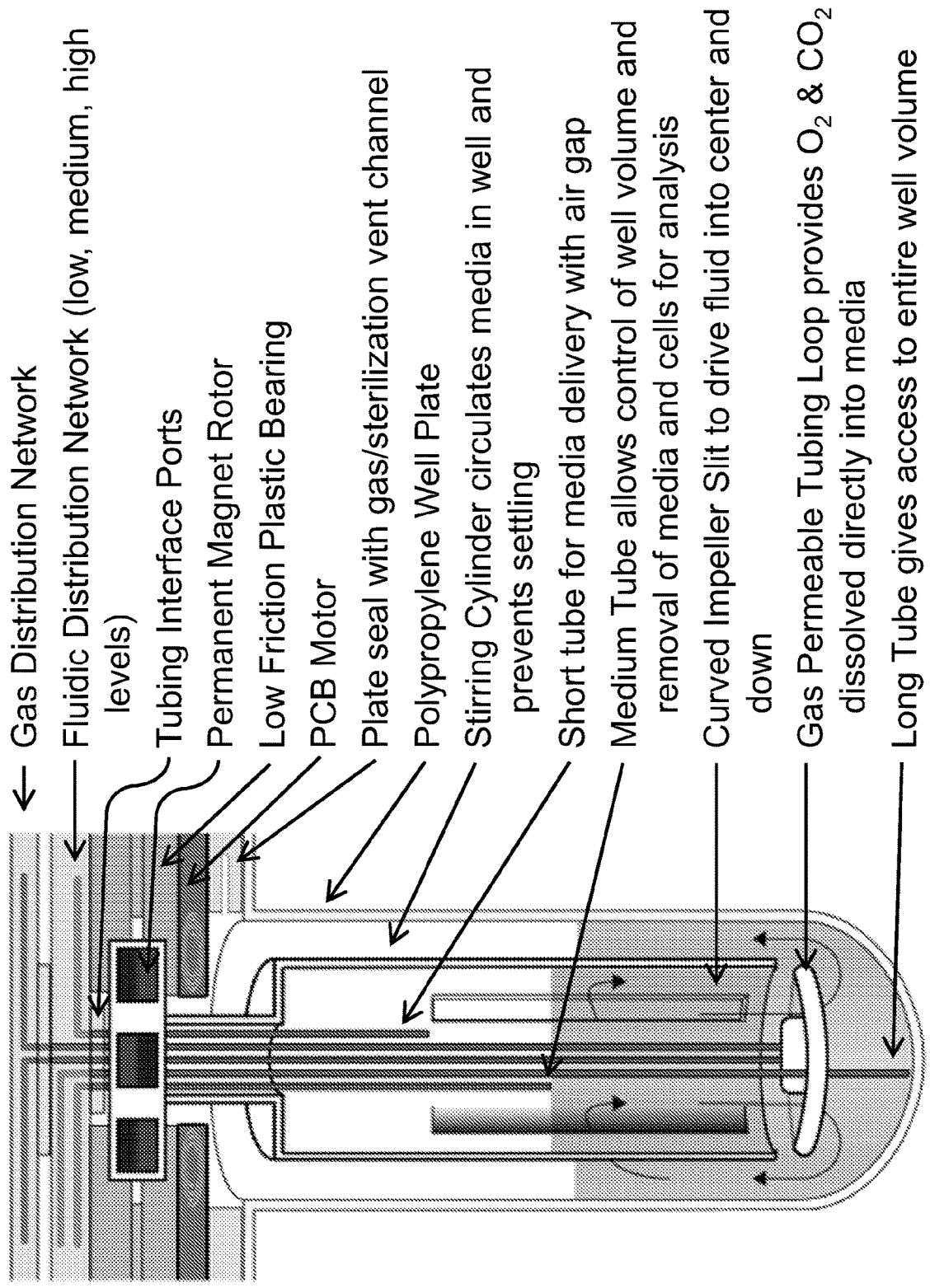
FIG. 12 shows schematically a chemostat subassemblies, according to certain embodiments of the invention.
Figure 13:
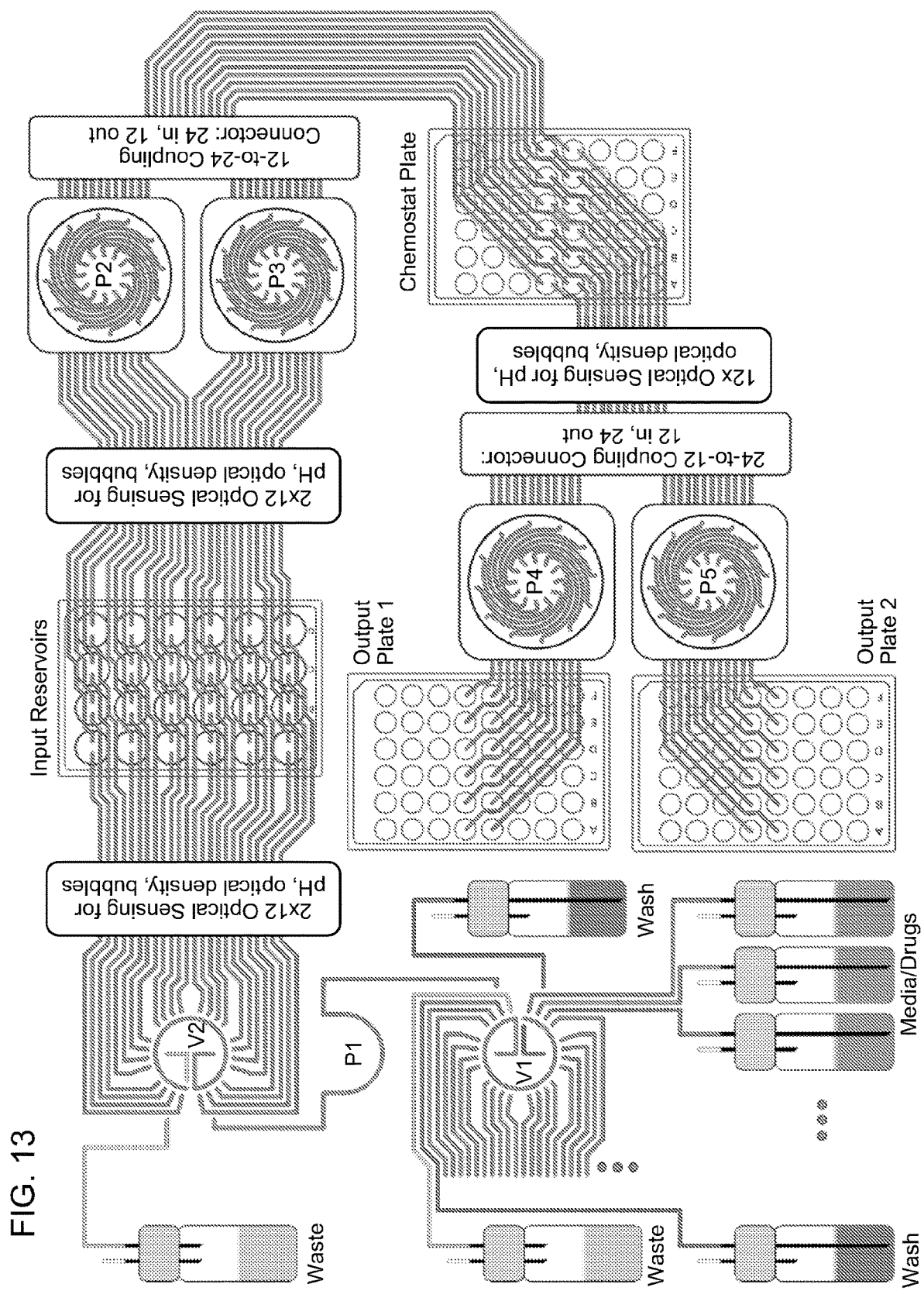
FIG. 13 shows schematically a fluidic system for a continuous parallel sampling chemostat, according to certain embodiments of the invention.

The chemostat is implemented, in this example, in a deep 48-well plate with round bottoms. As shown in FIG. 12, several different layers will comprise the lid to each microchemostat plate. At the top are the seven motors that drive the pumps and valves on the next layer. Beneath that is the cast lid that supports the pair of short and long vertical tubes that deliver and remove fluid from the well, as described in FIG. 3J. The stirrer system has individual PCB motors, bearings, and hollow split-tube rotating impellers that surround the two needles to provide unidirectional axial flow in one direction on the inside of the impeller tube and in the opposite direction outside. Finally, the gas delivery layer has a planar gas manifold. Immediately below are mechanical stirrers with individual custom planar printed-circuit-board brushless DC motors, or miniature commercial motors will drive a hollow-bore vertical impeller in each chemostat well, and an oxygen-permeable Teflon AF tube will deliver $O_2$ to each chemostat well, to ensure 5 second mixing and uniform, controlled oxygenation. All module components will be positioned on a caddy that serves as a baseplate. As shown, this module would occupy a single benchtop unit with three drawers. FIG. 13 shows a different embodiment in which there are two output plates so that one plate can be filled while the other is being removed for separate analysis and immediate replacement with an empty plate.

The expansion of this concept from 12 channels to 48 would involve the replacement of the microformulator director valve V2 with a 100-channel valve shown in FIGS. 4A-4G, or the used of four 25-port valves. FIG. 11 already incorporates the required 96-well plate for the input reservoirs. The 12-channel pumps shown can be replaced with 50-channel ribbon or other pumps, and the sensors and couplings can be either replicated four times or expanded to the requisite 48 or 96 channels.

Applications that can benefit immediately from the multi-well microchemostat technologies demonstrated in FIGS. 11-13 include advancing the systems biology of yeast metabolism by using it for closed-loop learning of genome-scale models of metabolism to identify mechanistically defining cellular pathways that promote growth recovery following stress; growth condition screening to connect environmental profiles to growth phenotypes; studying interacting microbial populations as needed to understand the population dynamics of cooperation in a single-species community evolving to repeated resource-limitation and the repurposing of gut microbial communities for production of platform chemicals from common sugars; evaluating the energetic costs of constructing and maintaining cells of various organisms and their constituent parts; optimizing growth and rapid-throughput screening of high-productivity CHO clones; mathematical modeling of all of the above areas; and the automation of metabolomic data extraction and model design.

Chemostats such as the systems in FIGS. 11-13 should prove invaluable in the identification and/or engineering of individual microbes or mixed microbial populations for industrial production of not only chemical feedstocks, but also for global-scale production of edible high-protein microbial biomass grown with either organic feedstock or, with less ecological impact, direct $CO_2$ fixation by either photosynthesis or microbial capture of industrial waste or atmospheric $CO_2$. Such systems can prove invaluable in increasing the efficiency of pharmaceutical proteins, antibody fragments, and complete antibodies by providing new alternatives to the mammalian cells currently used as hosts for biomanufacturing, including engineered *S. cerevisiae, Pichia pastoris*, and *Myceliophthora thermophila*.

The central concepts enabled by this invention are that multichannel pumps and valves can provide new methods for the parallelization of typically serial fluidic and analytical processes and the serialization of parallel ones. The valves shown in FIGS. 3A-3D through 10A-10C can be implemented with the rotary planar pumps and valves and other designs, or with integrated fluidic chips where multiple fluidic control functions are implemented in a single chip. If desired, physiological flow pulsations can be provided by periodic changes in pump speed or valve timing. These advances provide the necessary parallelism to sample with a common instrument various configurations of multiple organs-on-chips, tissue chips, or fluidic modules. The fluidic circuits shown schematically in FIGS. 8A-8E through 13 meet the challenge of coupling and analyzing individually multiple bio-objects with novel yet readily implemented pumps and valves. The number of channels in a single fluidic device can be increased from the demonstrated 12 to 100 channels without altering the topologies of the systems.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

Some references, which may include patents, patent applications, and various publications, are cited and discussed in the description of the invention. The citation and/or discussion of such references are provided merely to clarify the description of the invention and are not an admission that any such reference is "prior art" to the invention described herein. All references cited and discussed in this specification are incorporated herein by reference in their entireties and to the same extent as if each reference were individually incorporated by reference.

REFERENCES

[1]. Esch, M B, et al., How multi-organ microdevices can help foster drug development. Adv. Drug Del. Rev., 69:158-169. 2014.

[2]. Abaci, H E, and Shuler, M L. Human-on-a-chip design strategies and principles for physiologically based pharmacokinetics/pharmacodynamics modeling. Integr. Biol., 7:383-391. 2015.

[3]. Wang, Y I, et al., Self-contained, low-cost Body-on-a-Chip systems for drug development. Exp. Biol. Med.: Accepted. 2017.

[4] Maschmeyer, I, et al., A four-organ-chip for interconnected long-term co-culture of human intestine, liver, skin and kidney equivalents. Lab Chip, 15:2688-2699. 2015.

[5] Edington, C D, et al., Interconnected Microphysiological Systems for Quantitative Biology and Pharmacology Studies. Sci. Rep., 8:4530. 2018.

[6]. Novick, A, and Szilard, L. Description of the Chemostat. Science, 112:715-716. 1950.

[7] Novick, A, and Szilard, L. Experiments with the Chemostat on Spontaneous Mutations of Bacteria. Proc. Natl. Acad. Sci., 36:708-719. 1950.

[8] Monod, J. La technique de culture continue théorie et applications. Ann. Inst. Pasteur (Paris), 79:390-410. 1950.

[9]. King, R D, et al., The Robot Scientist Adam. Comp, 42:46-54. 2009.

[10]. King, R D, Rowland, J, Oliver, S G, Young, M, Aubrey, W, Byrne, E, Liakata, M, Markham, M, Pir, P, Soldatova, L N, Sparkes, A, Whelan, K E, and Clare, A. The automation of science. Science, 324:85-89. 2009.

[11]. Sparkes, A, et al., Cheaper faster drug development validated by the repositioning of drugs against neglected tropical diseases. J. R. Soc. Interface, 12:20141289. 2015.

[12]. Coutant, A, et al., Closed-loop cycles of experiment design, execution, and learning accelerate systems biology model development in yeast. Proc. Natl. Acad. Sci. U.S.A., 116:18142-18147. 2019.

[13]. Ratcliffe, E, et al., A novel automated bioreactor for scalable process optimisation of haematopoietic stem cell culture. J. Biotechnol., 161:387-390. 2012.

[14]. Davis, D, et al., Modeling perfusion at small scale using ambr15™, In: Integrated Continuous Biomanufacturing II, ECI Symposium Series. C. Goudar, S. Farid, C. Hwang and K. Lacki, eds. 2015. https://dc.engconfintl.org/biomanufact_ii/128.

[15]. Zoro, B, and Tait, A, Development of a novel automated perfusion mini bioreactor "ambr® 250 perfusion", In: Integrated Continuous Biomanufacturing III, ECI Symposium Series. S. Farid, C. Goudar, P. Alves and V. Warikoo, eds. 2017. https://dc.engconfintl.org/biomanufact_ii/128.

[16]. Bareither, R, et al., Automated Disposable Small Scale Reactor for High Throughput Bioprocess Development: A Proof of Concept Study. Biotechnol. Bioeng., 110:3126-3138. 2013.

[17]. Zhong, Z W, et al., Automated Continuous Evolution of Proteins in Vivo. ACS Synth. Biol., 9:1270-1276. 2020.

[18]. Heins, Z J, et al., Designing Automated, High-throughput, Continuous Cell Growth Experiments Using eVOLVER. J. Vis. Exp.: e59652. 2019.

[19]. Wong, B G, et al., Precise, automated control of conditions for high-throughput growth of yeast and bacteria with eVOLVER. Nat. Biotechnol., 36:614-623. 2018.

[20]. Lee, K S, et al., Microfluidic chemostat and turbidostat with flow rate, oxygen, and temperature control for dynamic continuous culture. Lab Chip, 11:1730-1739. 2011.

[21]. Bower, D M, et al., Fed-batch microbioreactor platform for scale down and analysis of a plasmid DNA production process. Biotechnol. Bioeng., 109:1976-1986. 2012.

[22]. King, R D, et al., Make Way for Robot Scientists. Science, 325:945-945. 2009.

[23]. Bilsland, E, et al., Yeast-based automated high-throughput screens to identify anti-parasitic lead compounds. Open Biology, 3:120158. 2013.

[24]. King, R D. Automating Chemistry and Biology Using Robot Scientists. In: Ki 2015: Advances in Artificial Intelligence, Lecture Notes in Artificial Intelligence, Vol 9324. S. Holldobler, M. Krotzsch, R. Penaloza and S. Rudolph, eds. pp XIV-XV. 2015.

[25]. King, R D, and Roberts, S, Artificial intelligence and machine learning in science, In: OECD Science, Technology and Innovation Outlook 2018: Adapting to technological and societal disruption, Cha 5. OECD Publishing, Paris. pp 121-136. 2018. https://doi.org/10.1787/sti_in_outlook-2018-10-en.

[26]. Wikswo, J, et al., Scaling and systems biology for integrating multiple organs-on-a-chip. Lab Chip, 13:3496-3511. 2013.

[27]. Darby, S, et al., A metering rotary nanopump for microfluidic systems. Lab Chip, 10:3218-3226. 2010. PMCID: PMC4156019.

[28]. Wikswo, J P, et al., Engineering Challenges for Instrumenting and Controlling Integrated Organ-on-Chip Systems. IEEE Trans. Biomed. Eng., 60:682-690. 2013. PMCID: PMC3696887.

[29]. Block III, F E, et al., "Normally closed microvalve and applications of the same," U.S. Pat. No. 9,618,129 B2 (Apr. 11, 2017).

[30]. Markov, D A, et al., Tape underlayment rotary-node (TURN) valves for simple on-chip microfluidic flow control. Biomed. Microdevices, 12:135-144. 2010.

[31]. LeDuc, P R, Messner, W C, and Wikswo, J P. How do control-based approaches enter into biology? Annu. Rev. Biomed. Eng., 13:369-396. 2011.

[32]. Cyr, K J, Avaldi, O M, and Wikswo, J P. Circadian hormone control in a human-on-a-chip: In vitro biology's ignored component? Exp. Biol. Med., 242:1714-1731. 2017. PMCID: PMC5832251.

[33]. Blank, R, "Pulseless, reversible precision piston-array pump," Wolcott, D K, and Marshall, G D, 6,079,313 (27 Jun. 2000).

[34]. Block III, F E, et al., "Organ on chip integration and applications of the same," U.S. Pat. No. 9,874,285 B2 (Jan. 23, 2018).

[35]. Wikswo, J P, et al., "Integrated organ-on-chip systems and applications of the same," U.S. Pat. No. 10,078,075 B2 (Sep. 18, 2018).
[36]. Wikswo, J P, et al., "Integrated Organ-on-Chip Systems and Applications of the Same," U.S. Pat. No. 10,444,223 B2 (Oct. 15, 2019).
[37]. Wikswo, J P, et al., "Multicompartment Layered and Stackable Microfluidic bioreactors and Applications of same," U.S. Pat. No. 10,464,064 B1 (Nov. 5, 2019).
[38]. Gould, P A, et al., "Peristaltic micropump and related systems and methods," U.S. Pat. No. 10,487,819 B2 (Nov. 26, 2019).
[39]. Wikswo, J P, et al., "Multicompartment layered and stackable microfluidic bioreactors and applications of same", U.S. Pat. No. 10,532,354 B2 (Jan. 14, 2020).
[40]. Miller, D R, et al., A bistable, multiport valve enables microformulators creating microclinical analyzers that reveal aberrant glutamate metabolism in astrocytes derived from a tuberous sclerosis patient. Sens. Actuators B Chem., 341:129972. 2020.
[41]. Wikswo, J P, et al., "Interconnections of multiple perfused engineered tissue constructs and microbioreactors, multi-microformulators and applications of the same," U.S. Pat. No. 10,577,574 B2 (Mar. 3, 2020).
[42]. NCATS Supports Award-Winning Technology for Drug Development: NIH; 2018 [updated Sep. 21, 2018. https://ncats.nih.gov/pubs/features/microformulator (accessed Jan. 2, 2019).
[43]. Wikswo, J P, et al., "Interconnections of multiple perfused engineered tissue constructs and microbioreactors, multi-microformulators and applications of the same," U.S. Pat. No. 10,023,832 B2 (Jul. 17, 2018).
[44]. Wikswo, J P, et al., "System and method for microdialysis imaging and regional fluidic delivery and control and applications of same," U.S. Pat. No. 10,538,726 B2 (Jan. 21, 2020).

What is claimed is:

1. A fluidic system, comprising:
one or more feedstock solution reservoirs containing feedstock solutions;
at least one microformulator fluidically coupled to the one or more feedstock solution reservoirs for mixing at least one of the feedstock solutions selectively from at least one of the one or more feedstock solution reservoirs to provide mixed solutions;
an input reservoir plate fluidically coupled to the at least one microformulator for storing the mixed solutions delivered from the at least one microformulator;
a chemostat plate comprising an array of chemostats fluidically coupled to the input reservoir plate for continuous delivery of the mixed solutions from the input reservoir plate to each chemostat; and
an output module fluidically coupled to the chemostat plate for analysis and sampling,
wherein each of the at least one microformulators comprises:
at least one input selector valve fluidically coupled to the one or more feedstock solution reservoirs to operably select the at least one of the one or more feedstock solution reservoirs;
at least one output director valve fluidically coupled to the input reservoir plate; and
at least one pump fluidically coupled between the at least one input selector valve and the at least one output director valve for operably withdrawing the at least one of the feedstock solutions from the selected at least one of the one or more feedstock solution reservoirs through the at least one input selector valve and delivering it to the input reservoir plate through the at least one output director valve.

2. The fluidic system of claim 1, wherein the at least one input selector valve is configured to select different feedstock solution reservoirs at different periods of time.

3. The fluidic system of claim 1, wherein the at least one pump is driven such that the fluid of the selected feedstock solution reservoir outputs from the at least one output director valve at a predetermined flow rate.

4. The fluidic system of claim 3, wherein the predetermined flow rate varies with time.

5. The fluidic system of claim 1, wherein the at least one input selector valve is a multichannel input selector valve, the at least one pump is a single-channel pump, and the at least one output director valve is a multichannel output director valve.

6. The fluidic system of claim 1, wherein through a sequence of selecting a plurality of reservoirs by the at least one input selector valve and pump speed and duration actuations of the at least one pump, the media is provided to have a different time-varying perfusion mixture for each chemostat.

7. The fluidic system of claim 1, wherein each of the at least one microformulators further includes a single-channel optical sensing module coupled between the at least one pump and the at least one output director valve for tracking an intentionally injected bubble for measurement of flow rate, or identifying when a reservoir is emptied.

8. The fluidic system of claim 1, further comprising:
at least one first multichannel pump fluidically coupled between the input reservoir plate and the chemostat plate;
at least one second multichannel pump fluidically coupled between the chemostat plate and the output module.

9. The fluidic system of claim 8, wherein the input reservoir plate has two sets of media ports, and wherein at least one first multichannel pump comprises two first multichannel pumps, each first multichannel pump is fluidically coupled between a respective set of the media ports and the chemostat plate, such that one set is refillable while the other set is being delivered by a corresponding pump to each chemostat in the chemostat plate, providing uninterrupted perfusion.

10. The fluidic system of claim 8, wherein at least one second multichannel pump comprises two second multichannel pumps.

11. The fluidic system of claim 8, wherein the output module comprises an analyzer, wherein the fluidic system further comprises at least one output valve fluidically coupled between the at least one second multichannel pumps and the analysis module.

12. The fluidic system of claim 8, wherein the output module comprises an output plate fluidically coupled to the at least one second multichannel pumps.

13. The fluidic system of claim 8, wherein effluent from each chemostat is collected by the at least one second multichannel pump and delivered to the at least one output valve.

14. The fluidic system of claim 11, wherein the at least one output valve either delivers the effluent from each chemostat to a separate well in an output plate, or allows each effluent line, one at a time, to be diverted to an analyzer or other output device.

15. The fluidic system of claim 8, wherein effluent from all the chemostats is diverted to waste to ensure continuous perfusion when no sample is needed or the output plate is removed after bulk sample collection.

16. The fluidic system of claim 1, wherein the chemostats are operably inoculated by using an external pipettor to seed either the chemostat plate, which is removable, or a transfer plate that has one or more seeded wells and is then installed in place of the output plate with the at least one second pump run in reverse to deliver the selected cells into various chemostats to restart their culture.

17. The fluidic system of claim 1, wherein the chemostat plate is operably implemented in a well plate.

18. The fluidic system of claim 1, further comprising a plurality of multichannel optical sensing modules.

19. The fluidic system of claim 18, wherein a first one of the multichannel optical sensing modules is coupled between the at least one first multichannel pump and the chemostat plate, and a second one of the multichannel optical sensing modules is coupled between the chemostat plate and the at least one second multichannel pump for measuring $PO_2$, $PCO_2$, pH, and/or optical density (OD) of the media entering and leaving each chemostat, respectively.

20. The fluidic system of claim 18, wherein a first one of the multichannel optical sensing modules is coupled between the at least one microformulator and the input reservoir plate, and a second one of the multichannel optical sensing modules is coupled between the input reservoir plate and the at least one first multichannel pump, and a third one of the multichannel optical sensing modules is coupled between the chemostat plate and the at least one second multichannel pump, for measuring $PO_2$, $PCO_2$, PH, and/or optical density (OD).

21. The fluidic system of claim 1, wherein the output module comprises two output plates, so that one output plate is fillable while the other output plate is being removed for separate analysis and immediate replacement with an empty plate.

* * * * *